(12) United States Patent
Goetsch et al.

(10) Patent No.: US 12,214,632 B2
(45) Date of Patent: Feb. 4, 2025

(54) LIFT DEVICES FOR CONTAINERS

(71) Applicant: Daniel B. Goetsch, Lucerne Valley, CA (US)

(72) Inventors: Daniel B Goetsch, Upland, CA (US); Clint Griffith, Lucerne Valley, CA (US)

(73) Assignee: Daniel B. Goetsch, Lucerne Valley, CA (US)

( * ) Notice: Subject to any disclaimer, the term of this patent is extended or adjusted under 35 U.S.C. 154(b) by 0 days.

(21) Appl. No.: 18/823,941

(22) Filed: Sep. 4, 2024

(65) Prior Publication Data

US 2025/0001819 A1     Jan. 2, 2025

Related U.S. Application Data

(63) Continuation-in-part of application No. 18/367,237, filed on Sep. 12, 2023, which is a continuation of application No. 18/129,818, filed on Mar. 31, 2023, now Pat. No. 11,752,814.

(60) Provisional application No. 63/421,648, filed on Nov. 2, 2022, provisional application No. 63/357,896, filed on Jul. 1, 2022, provisional application No. 63/354,826, filed on Jun. 23, 2022, provisional application No. 63/335,355, filed on Apr. 27, 2022, provisional application No. 63/327,871, filed on Apr. 6, 2022.

(51) Int. Cl.
*B60D 1/44*     (2006.01)
*B60D 1/01*     (2006.01)
*B60D 1/167*     (2006.01)
*B60P 3/40*     (2006.01)
*F16B 21/02*     (2006.01)

(52) U.S. Cl.
CPC ........... *B60D 1/1675* (2013.01); *B60D 1/015* (2013.01); *B60D 1/44* (2013.01); *B60P 3/40* (2013.01); *F16B 21/02* (2013.01)

(58) Field of Classification Search
CPC ........ B60D 1/1675; B60D 1/015; B60D 1/44; B60P 3/40; F16B 21/02
See application file for complete search history.

(56) References Cited

U.S. PATENT DOCUMENTS 3,631,999 A * 1/1972 Walerowski ......... B65D 90/146
    280/43.11
5,738,471 A * 4/1998 Zentner ................. B60P 7/0807
    410/101

(Continued)

*Primary Examiner* — Kevin Hurley
*Assistant Examiner* — Marlon A Arce
(74) *Attorney, Agent, or Firm* — Manuel de la Cerra

(57) ABSTRACT

A connection structure is disclosed for use with a container having a mounting block with an elongate mounting hole. The connection structure includes a flange with a threaded hole that defines a bolt axis. A rotational plane is perpendicular to the bolt axis. The flange has a first (obstruction) portion constructed to pass through the elongate mounting hole in a first rotational orientation within the rotational plane and constructed to be prevented from passing through the elongate mounting hole in a second rotational orientation within the rotational plane. The flange also has a second (seating) portion constructed to seat into the elongate mounting hole when the flange is in the second rotational orientation, thereby preventing rotation of the flange. A bolt is disposed in the threaded hole.

14 Claims, 43 Drawing Sheets

Top Block Connection Assembly

(56) References Cited

U.S. PATENT DOCUMENTS

| | | | | |
|---|---|---|---|---|
| 10,800,468 | B2* | 10/2020 | Standifer | B60D 1/015 |
| 11,597,453 | B2* | 3/2023 | Borntrager | B60P 3/40 |
| 2010/0111633 | A1* | 5/2010 | Pedersen | F03D 13/40 |
| | | | | 410/44 |
| 2012/0298935 | A1* | 11/2012 | Ross | B60P 3/40 |
| | | | | 254/2 R |
| 2017/0370113 | A1* | 12/2017 | Nyce | E04B 1/34807 |
| 2018/0118542 | A1* | 5/2018 | Shelagowski | B66F 9/24 |
| 2020/0231080 | A1* | 7/2020 | Weatherby, III | B60P 1/6481 |
| 2021/0347559 | A1* | 11/2021 | Helou, Jr. | B65D 88/14 |

* cited by examiner

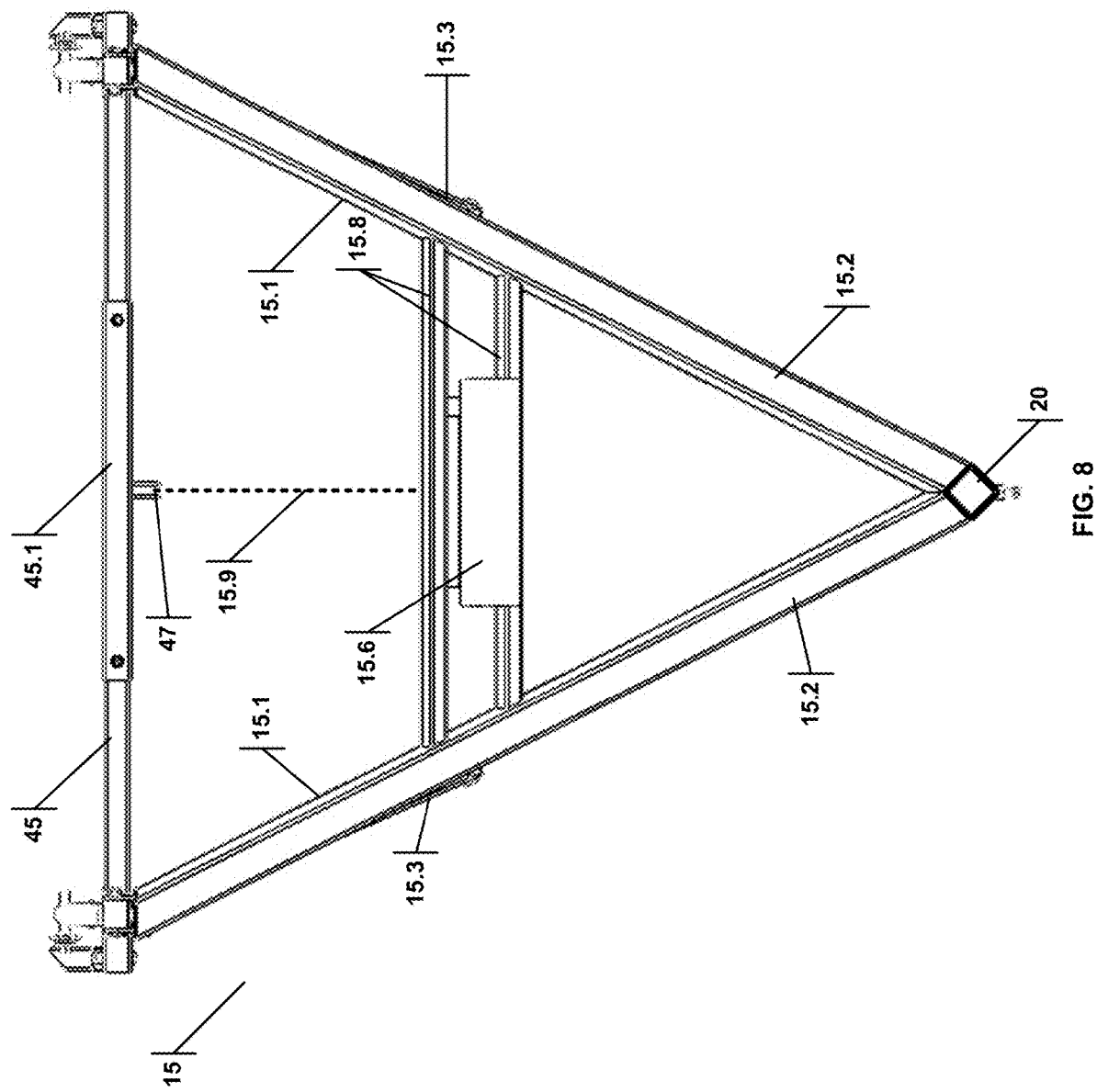

Top Block Connection Assembly

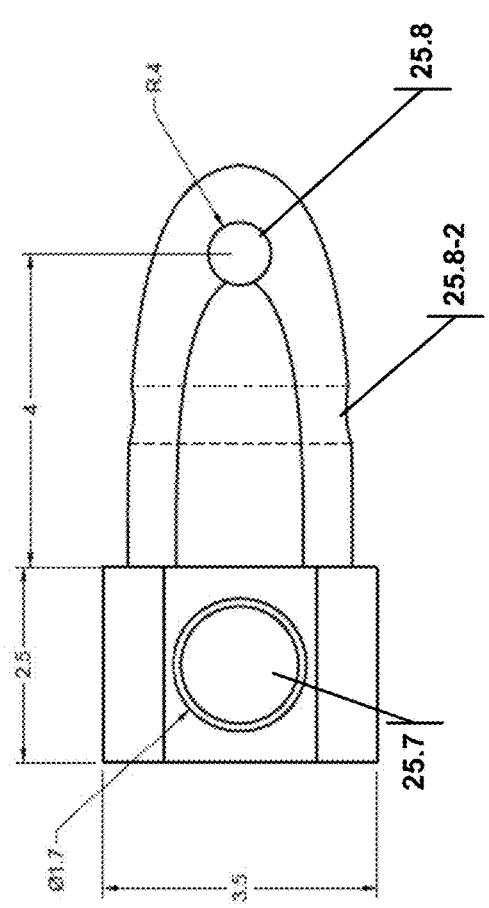
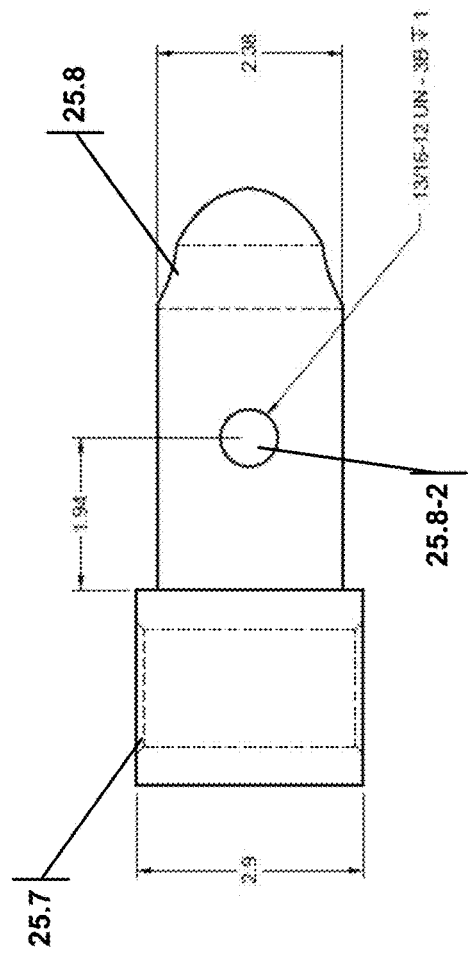
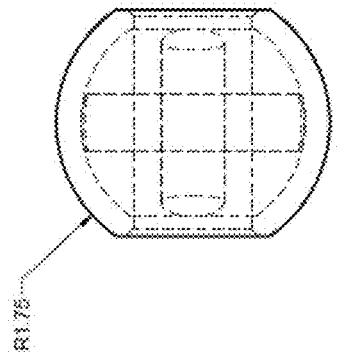
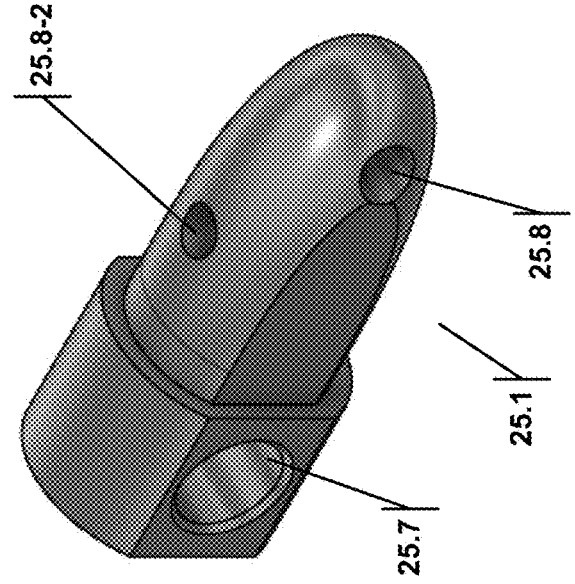
FIG. 12B

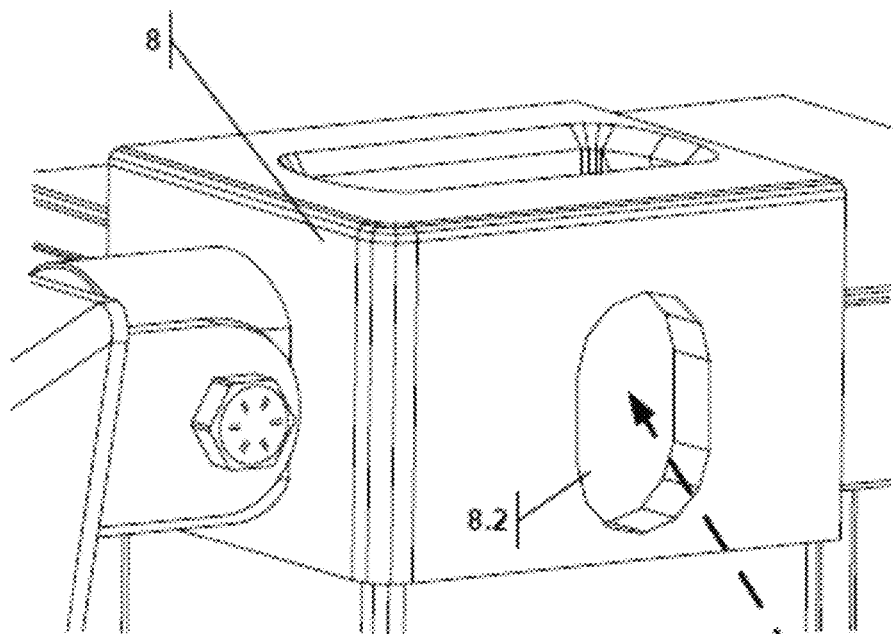
FIG. 13A
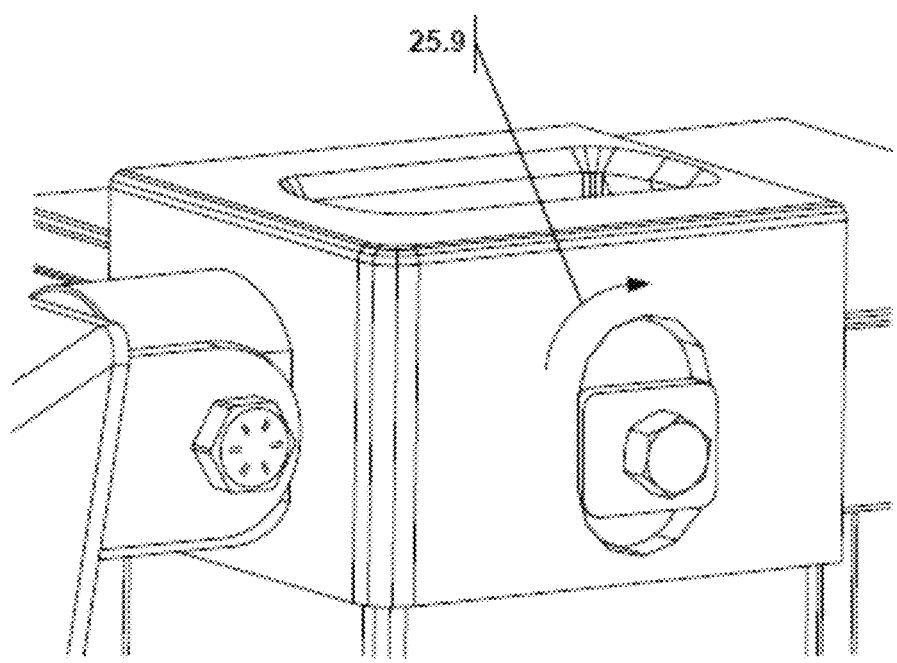
FIG. 13B

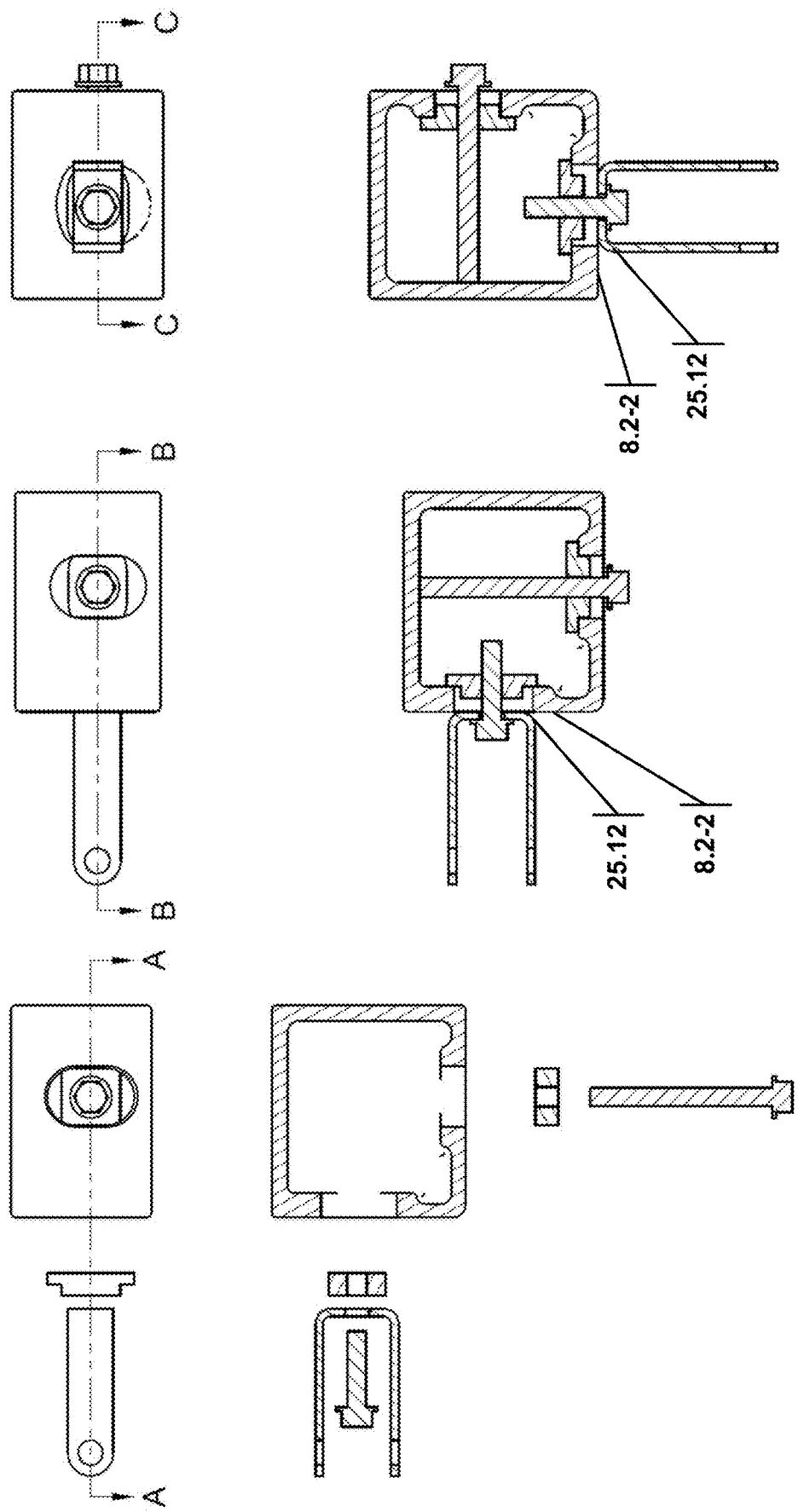

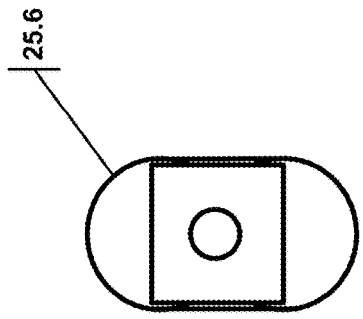
FIG. 13N
(First Rotational Orientation)
FIG. 13O
(Second Rotational Orientation)
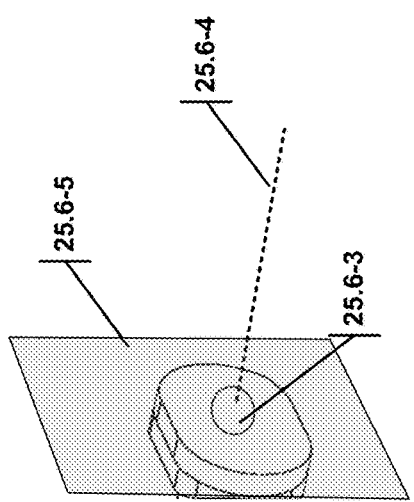
FIG. 13L
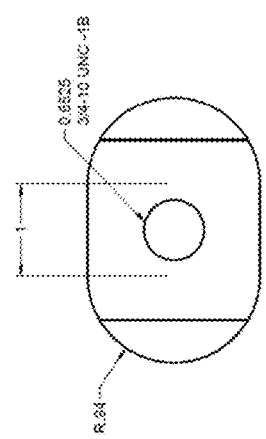
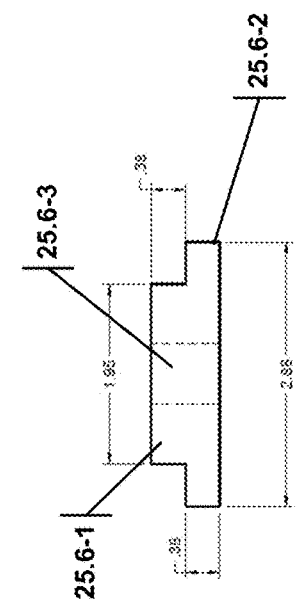
FIG. 13M Bottom Block Connection Assembly

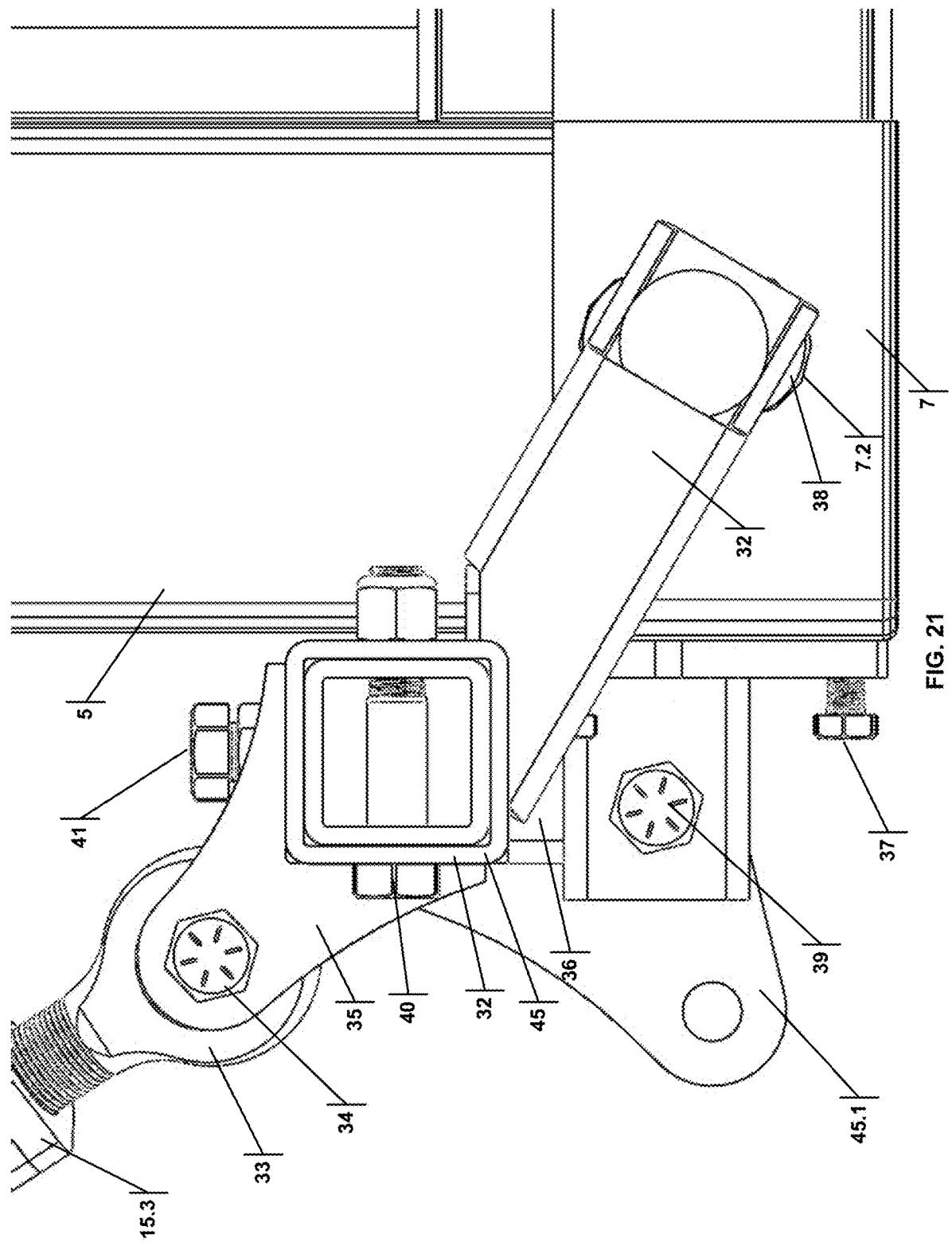

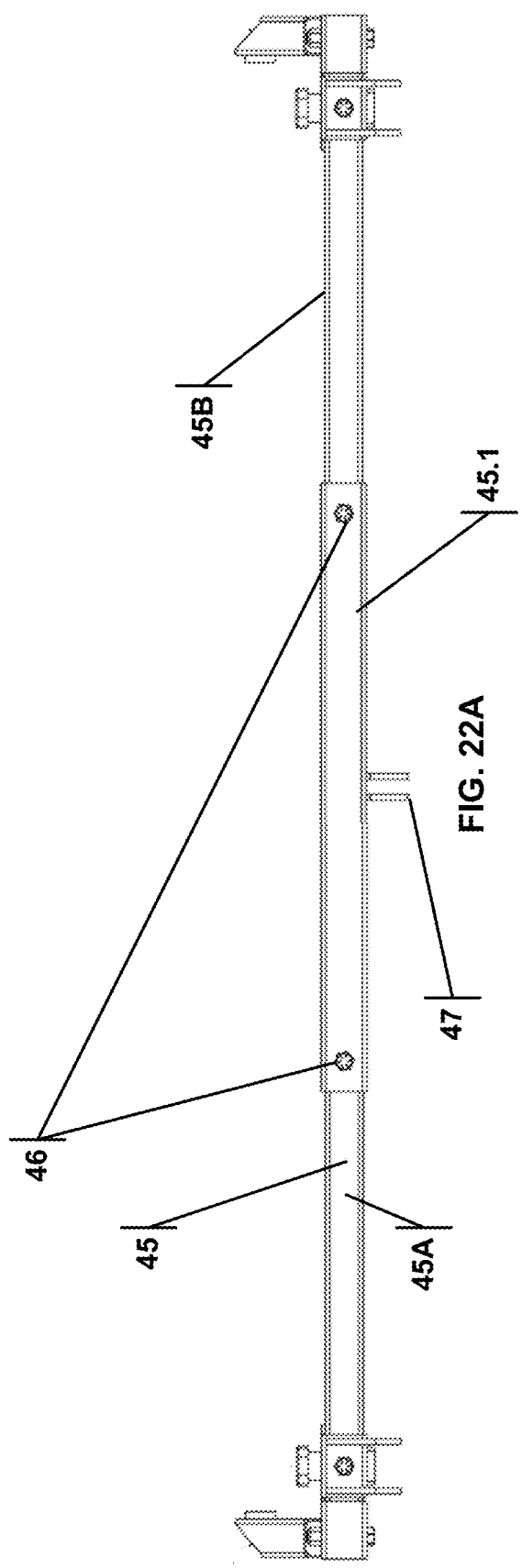
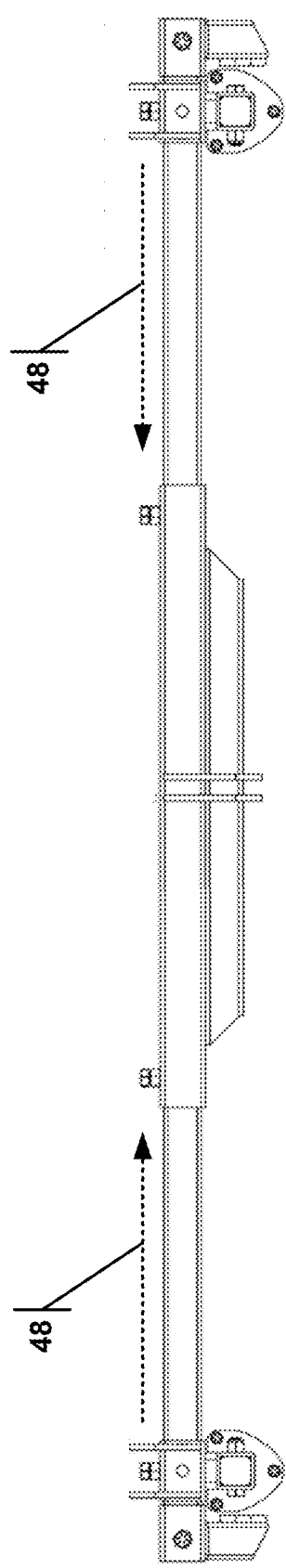
FIG. 22A
FIG. 22B

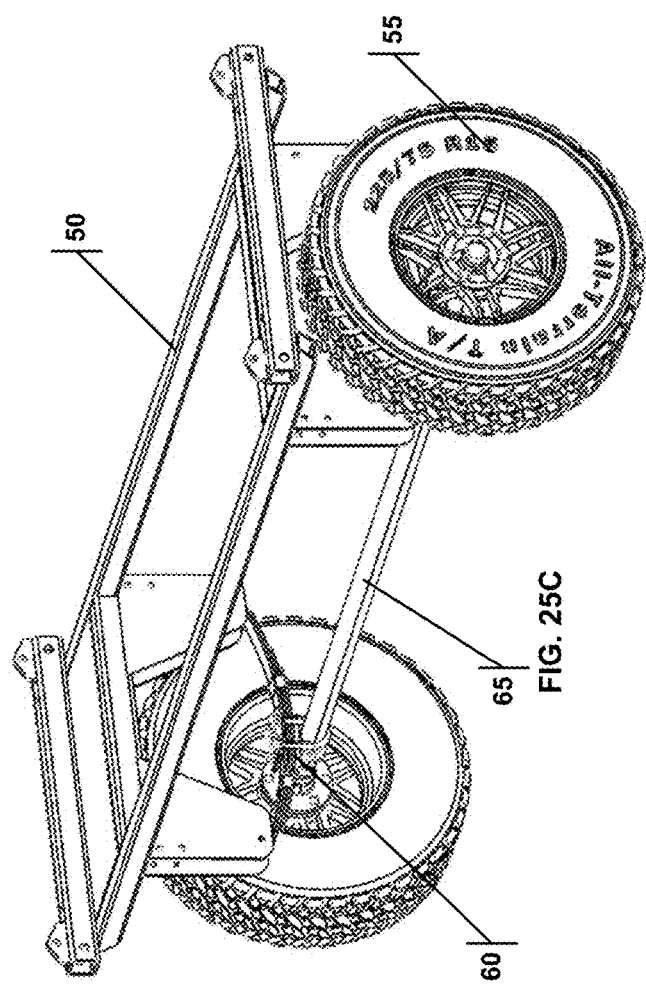
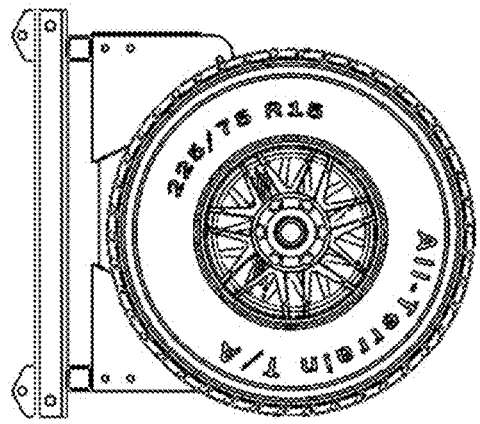
FIG. 25C
FIG. 25D

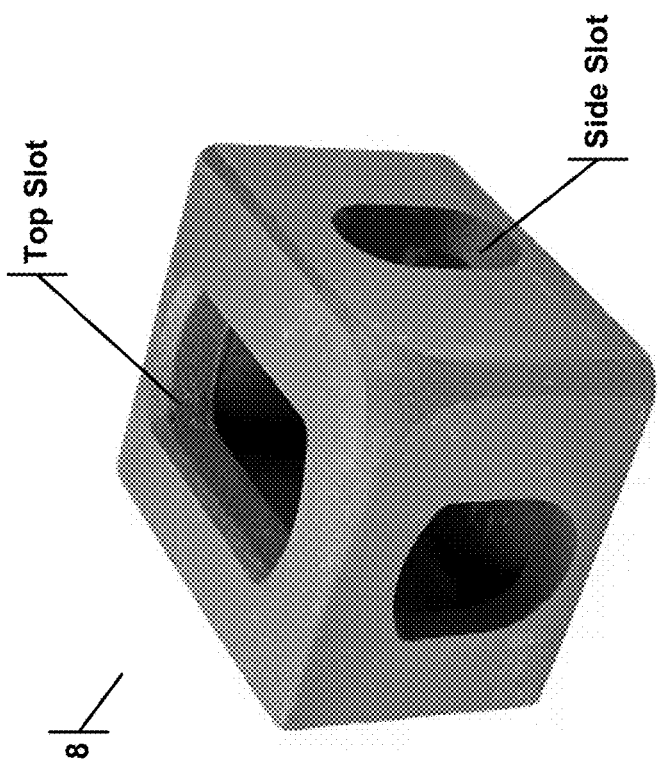
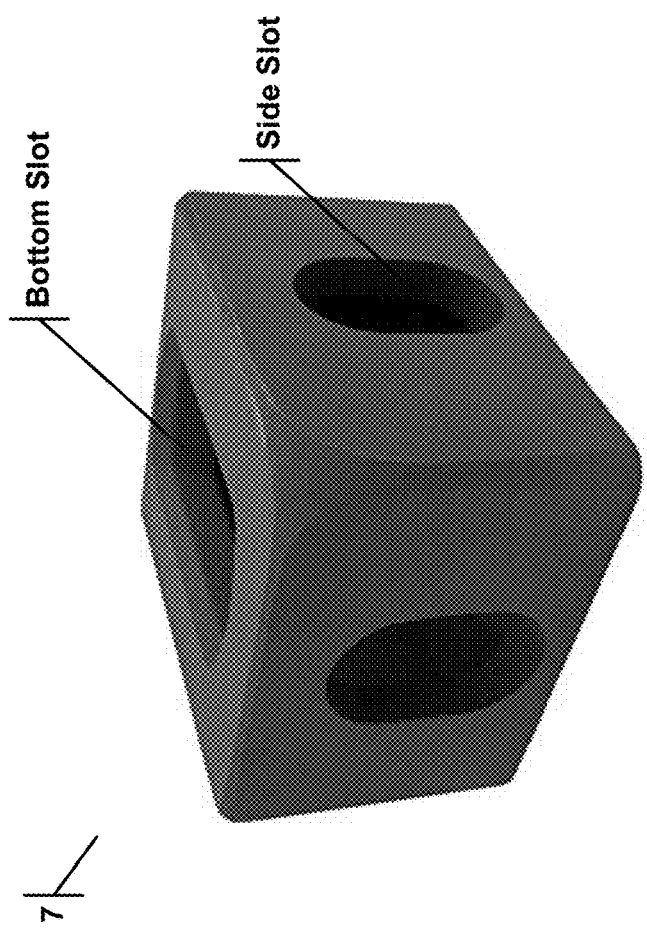
FIG. 26
(Prior Art)

LIFT DEVICES FOR CONTAINERS

CROSS-REFERENCE TO RELATED APPLICATIONS

This application claims priority as a continuation-in-part of U.S. application Ser. No. 18/367,237, titled Lift Devices for Containers, filed on Sep. 12, 2023, which claims priority as a continuation of U.S. application Ser. No. 18/129,818, titled Lift Devices for Containers, filed on Mar. 31, 2023 (now U.S. patent Ser. No. 11/752,814 issued on Sep. 12, 2023); to U.S. provisional application 63/421,648, titled Lift Devices for Container, filed on Nov. 22, 2022; and to U.S. provisional application 63/450,539, titled Lift Devices for Container, filed on Mar. 7, 2023. U.S. application Ser. No. 18/129,818 further claims priority to provisional application 63/327,871, titled Lift Devices for Container, filed on Apr. 6, 2022; to U.S. provisional application 63/335,355, titled Lift Devices for Container, filed on Apr. 27, 2022; to U.S. provisional application 63/354,826, titled Lift Devices for Container, filed on Jun. 23, 2022; and to U.S. provisional application 63/357,896, titled Lift Devices for Container, filed on Jul. 1, 2022. All these applications are incorporated herein by reference in their entireties.

This application is also related to U.S. application Ser. No. 17/237,883, titled Swing Caster Dolly, filed on Apr. 22, 1921, the entire contents of which are incorporated herein by reference in its entirety.

FIELD OF THE INVENTION

This invention relates to devices used to lift cargo containers.

BACKGROUND OF THE INVENTION

Cargo shipping containers generally have four corner top container mounting blocks 8 and four corner bottom container mounting blocks 7, each of which has two slot types, as shown in FIG. 26. A top/bottom slot (1 per block) is a 3"×4" connector called a "Hammer" or a "TwistLock". This is the most common connector, as it enables the stacking of cargo shipping containers on top of one another on boats 10 high. The corner blocks also have side slots (2 per corner), which are 2"×3". These slots are primarily used to access the top/bottom slots, but can also be used to connect to or mount to the corner mounting blocks 7, 8 of the cargo containers with a "LUGS" connector that can be used to pick up and move the cargo shipping container.

Current state-of-the-art wheel dollies are simply not robust enough to lift the weight of a cargo container. Moreover, these dollies require their own hydraulic lift mechanism to ultimately raise heavy objects from the floor. For example, U.S. Pat. No. 3,653,527 discloses a wheel dolly with an integrated hydraulic jack used to raise the wheel. Likewise, U.S. Pat. No. 4,050,597 discloses a similar jack system. The problem with these integrated jack systems is that they are heavy because of the additional weight from the dedicated jack system. They are also expensive for the same reason.

Other wheel dollies use a threaded bolt system to create the lift needed to raise the object. For example, U.S. Pat. No. 7,597,524 discloses a parallelogram lift system with a bolt that is turned to raise the wheels. U.S. Pat. No. 7,232,138 teaches a long bolt that, when turned, brings two arms in contact with the object, and, as the bolt is further turned, the arms lift the wheel. These systems, too, have shortcomings.

It can be very taxing to turn a bolt sufficiently to raise an object that weights several tons. Also, it can be unsafe to require a user to be so close to the object dolly with manual tools when lifting. Wheel dollies can fail for a variety of reasons, and a user should not be close to the dolly when such a failure occurs.

To meet these deficiencies, the art has turned to massive cranes, hoists, and specialized heavy jacks. These solutions are expensive, heavy, and complicated.

What is therefore needed are devices that overcome these deficiencies and allow for both lifting and easy movement of cargo shipping containers.

SUMMARY OF THE INVENTION

The present invention provides an elegant solution to the needs described above and offers numerous additional benefits and advantages, as will be apparent to persons of skill in the art. Specifically, a connection structure is disclosed for use with a container having a mounting block with an elongate mounting hole. The connection structure includes a flange with a threaded hole that defines a bolt axis. A rotational plane is perpendicular to the bolt axis. The flange has a first (obstruction) portion constructed to pass through the elongate mounting hole in a first rotational orientation within the rotational plane and constructed to be prevented from passing through the elongate mounting hole in a second rotational orientation within the rotational plane. The flange also has a second (seating) portion constructed to seat into the elongate mounting hole when the flange is in the second rotational orientation, thereby preventing rotation of the flange. A bolt is disposed in the threaded hole.

The first rotational orientation may be offset from the second rotational orientation by 90 degrees.

The connection structure may have a mounting bracket constructed to press against an exterior wall of the mounting block when in the secure configuration. The mounting bracket may further include a mounting structure. The connection structure may secure a structure to the interior or exterior of the mounting block. The connection structure may have several configurations including (1) an insertion configuration, wherein the flange is in the first rotational orientation, and the first (obstruction) portion and the second (seating) portion pass through the elongate mounting hole; (2) a seating configuration, wherein the bolt is rotated to place the flange in the second rotational orientation, seating the second (seating) portion into the elongate mounting hole and preventing the rotation of the flange; and (3) a secure configuration, wherein the bolt is rotated, causing the flange to move along the bolt axis and press against an interior wall of the mounting block.

The bolt may push against a second interior wall of the mounting block when in the secure configuration.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 8 is a top view of the V-Lift frame.

FIG. 12B is a detailed schematic with dimensions of the upper plug, with an extra mounting hole.

FIG. 13A illustrates the first rotational orientation used in the insertion configuration of the flange.

FIG. 13B illustrates the first-to-second rotational orientation transition used in the seating configuration of the flange.

FIG. 13I illustrates the cross-sectional view taken along line A-A of the exploded view of the flange with a mounting bracket.

FIG. 13J illustrates the cross-sectional view taken along line B-B of the assembled view of the flange with a mounting bracket.

FIG. 13K illustrates the cross-sectional view taken along line C-C of the assembled view of the flange with a mounting bracket.

FIG. 13L illustrates the bolt axis and the rotational plane.

FIG. 13M is a detailed schematic with dimensions of the flange.

FIG. 13N illustrates the first rotational orientation of the flange.

FIG. 13O illustrates the second rotational orientation of the flange.

FIG. 21 is a side view of the bottom block connection assembly connected to the bottom container mounting block of a container.

FIG. 22A is a top view of the cross bar.

FIG. 22B is a rear view of the cross bar.

FID. 24D illustrates attaching the set bolts to fix the cam lug more securely to the bottom container mounting block of a container.

Figure 25A:
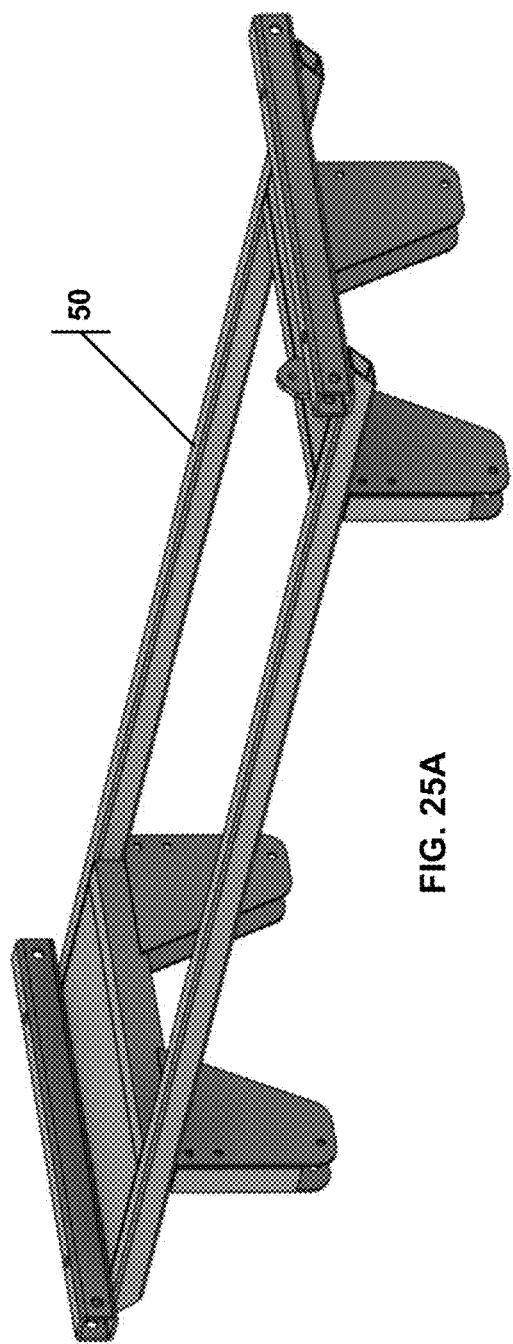

FIG. 25A is an isometric view of the container saddle.

Figure 25B:
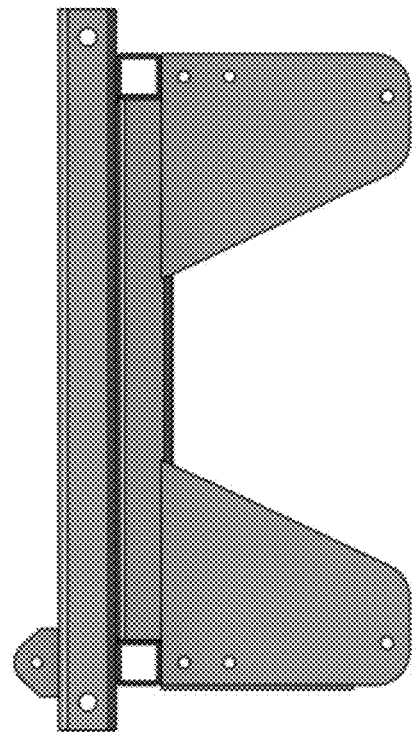

FIG. 25B is a side view of the container saddle.

FIG. 25C is an isometric view of the container saddle, with an axle and wheel.

FIG. 25D is a side view of the container saddle with an axle and wheel.

FIG. 26 illustrates a common top/bottom container mounting block used on a cargo container.

DETAILED DESCRIPTION OF THE INVENTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

Figure 1:
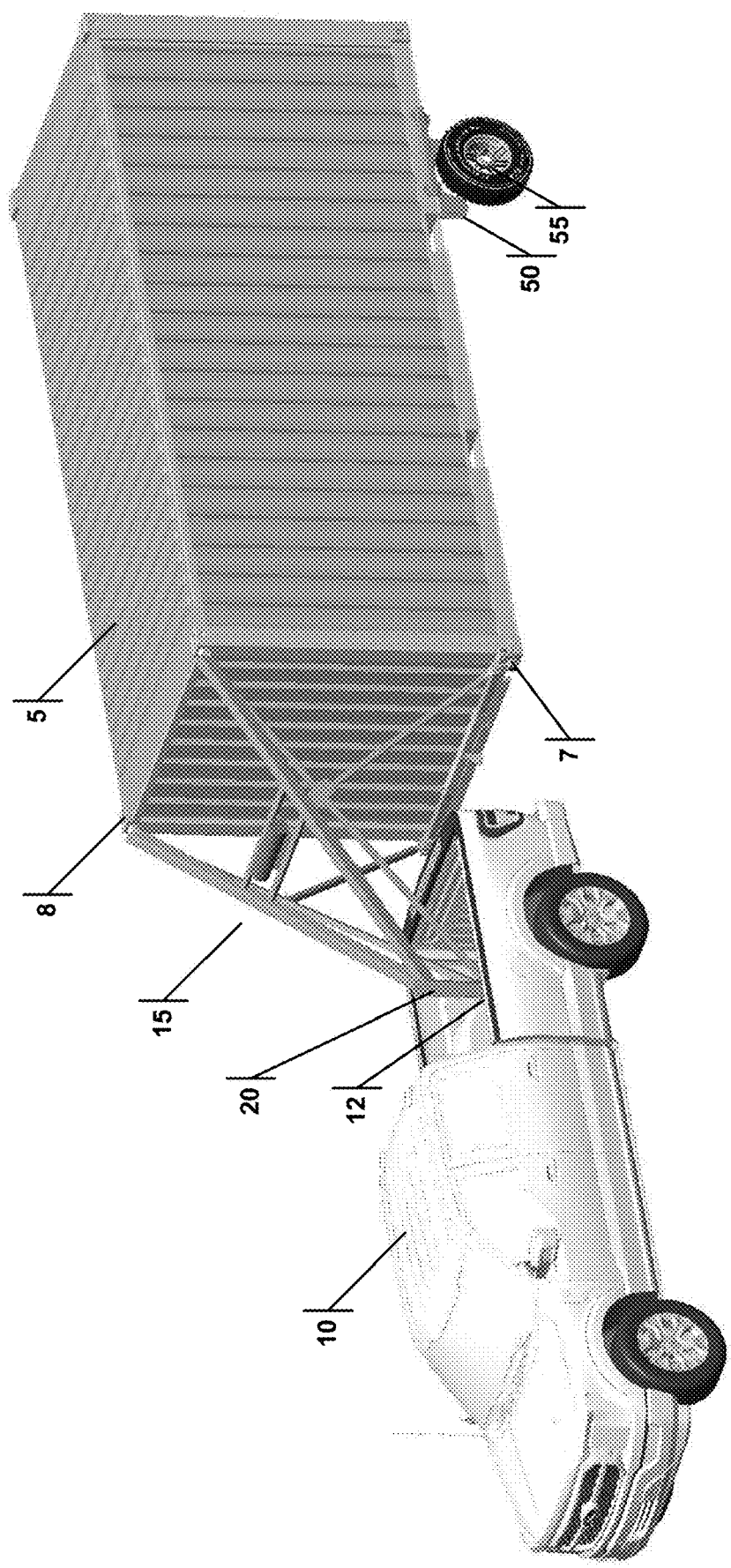
FIG. 1 illustrates a pickup truck connected to a container via a V-Lift frame.

The following list of example features corresponds with the attached figures and is provided for ease of reference, where like reference numerals designate corresponding features throughout the specification and figures:

5 Container
7 Bottom Container Mounting Block
7.1 Bottom Mounting Block Hole
7.2 Bottom Mounting Block Hole
8 Top Container Mounting Block
8.1 Top Mounting Block Hole
8.2 Top Mounting Block Hole
8.2-1 Interior Wall
8.2-1 Exterior Wall
8.3 Top Mounting Block Hole
10 Pickup Truck
12 Pickup Truck Bed Ball Joint
15 V-Lift Frame
15.1 Top V-Lift Frame Bars
15.2 Bottom V-Lift Frame Bars
15.3 Struts
15.4 Strut Pivot Mounting Plates
15.5 Strut Pivot Pin
15.6 Winch
15.7 Winch Plate
15.8 Winch Plate Cross Supports
15.9 Winch Cable
16 Controller
20 Gooseneck
20.1 Gooseneck Section
20.2 Gooseneck Section
20.3 Bolt
25 Top Block Connection Assembly
25.1 Upper Plug
25.2 Frame End Plate
25.3 Plug Pivot Plate
25.4 Plug Pivot Bolt
25.5 Plug Mounting Bolt
25.6 Plug Mounting Bolt Flange
25.6-1 First (Obstruction) Portion of the Flange
25.6-2 Second (Seating) Portion of the Flange
25.6-3 Threaded Hole
25.6-4 Bolt Axis
25.6-5 Rotational Plane
25.7 Pivot Bolt Receiver Hole
25.8 Mounting Bolt Receiver Hole
25.8-2 Mounting Bolt Receiver Hole
25.9 Rotation of Plug Mounting Bolt Flange
25.10 Rotation of Plug Mounting Bolt
25.11 Translational Movement of Plug Mounting Bolt Flange
25.12 Mounting Bracket
25.13 Bracket Mounting Structure
26 Plug Flat Sides
27 Expanded Rim
28 Bearings
30 Bottom Block Connection Assembly
31 Cam Lug
31.1 Connection Post
31.2 Post Hole
31.3 Cam Flange
31.4 Set Bolt Threading
31.5 Necked Lug
31.6 Oblong Tip
31.7 Cam Lug Rotation
32 Orthogonal Connection Bar
33 Heim Joint
34 Heim Support Bolt
35 Heim Supports
36 Cross-Bar Connector
37 Set Bolt
38 Lug
39 Bolt
40 Bolt
41 Bolt
45 Cross Bar
45A Cross-Bar Section
45B Cross-Bar Section
45.1 Cross-Bar Eyelet Bracket
46 Bolt
47 Position to Attach Winch Cable
48 Direction of Cross Bar Slide
50 Container Saddle 55 Container Saddle Wheel
60 Leaf Spring
65 Axle FIG. 1 illustrates a V-Lift frame 15 connecting a pickup truck 10 to a top mounting block 8 and to a bottom mounting block 7 of a container 5. The pickup 10 has a ball joint that is attached to the gooseneck 20 of the V-Lift Frame 15. The container 5 sits within a container saddle 50 with wheels 55.

Figure 2:
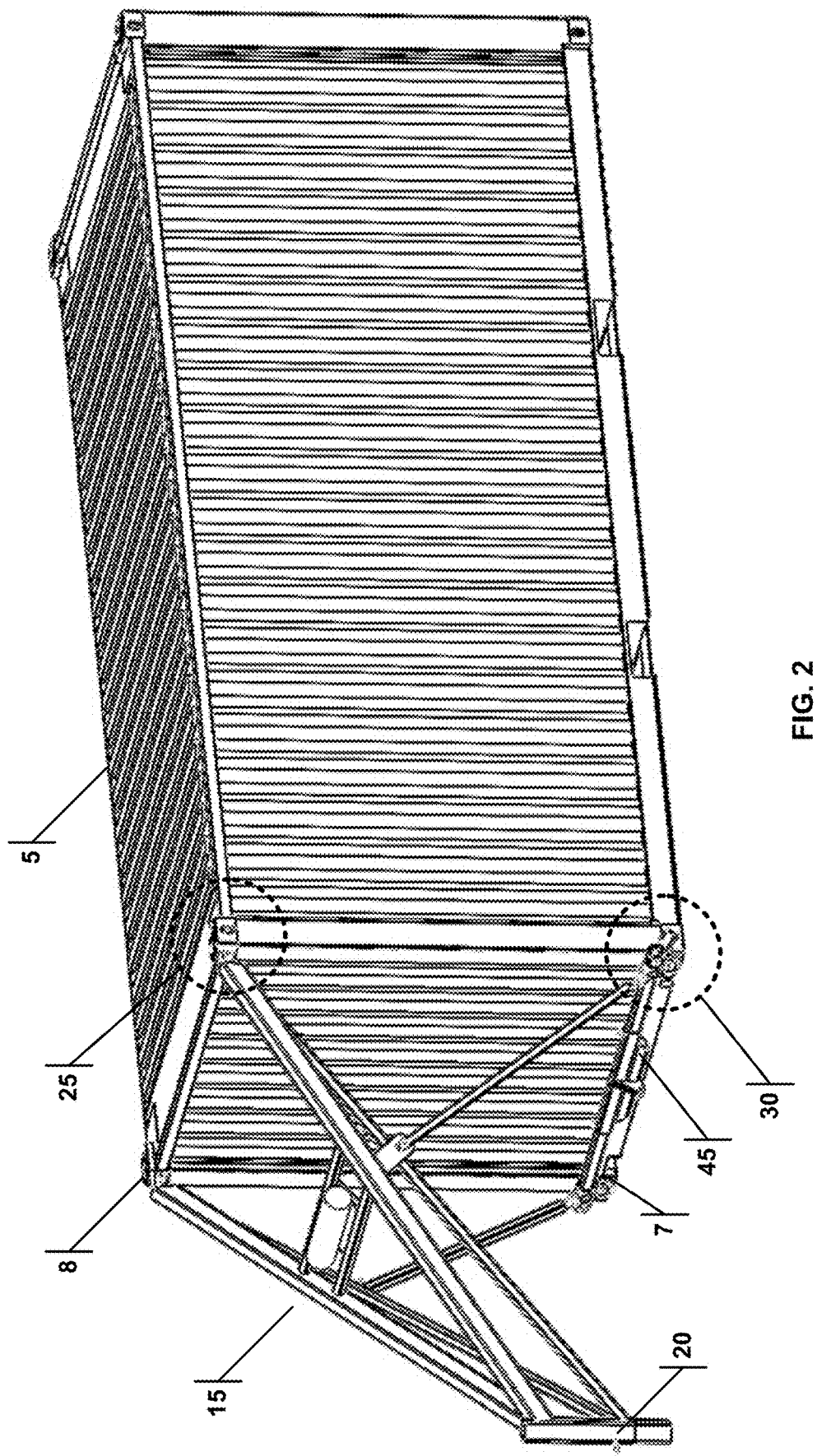
FIG. 2 illustrates a container connected to a V-Lift frame.
Figure 3:
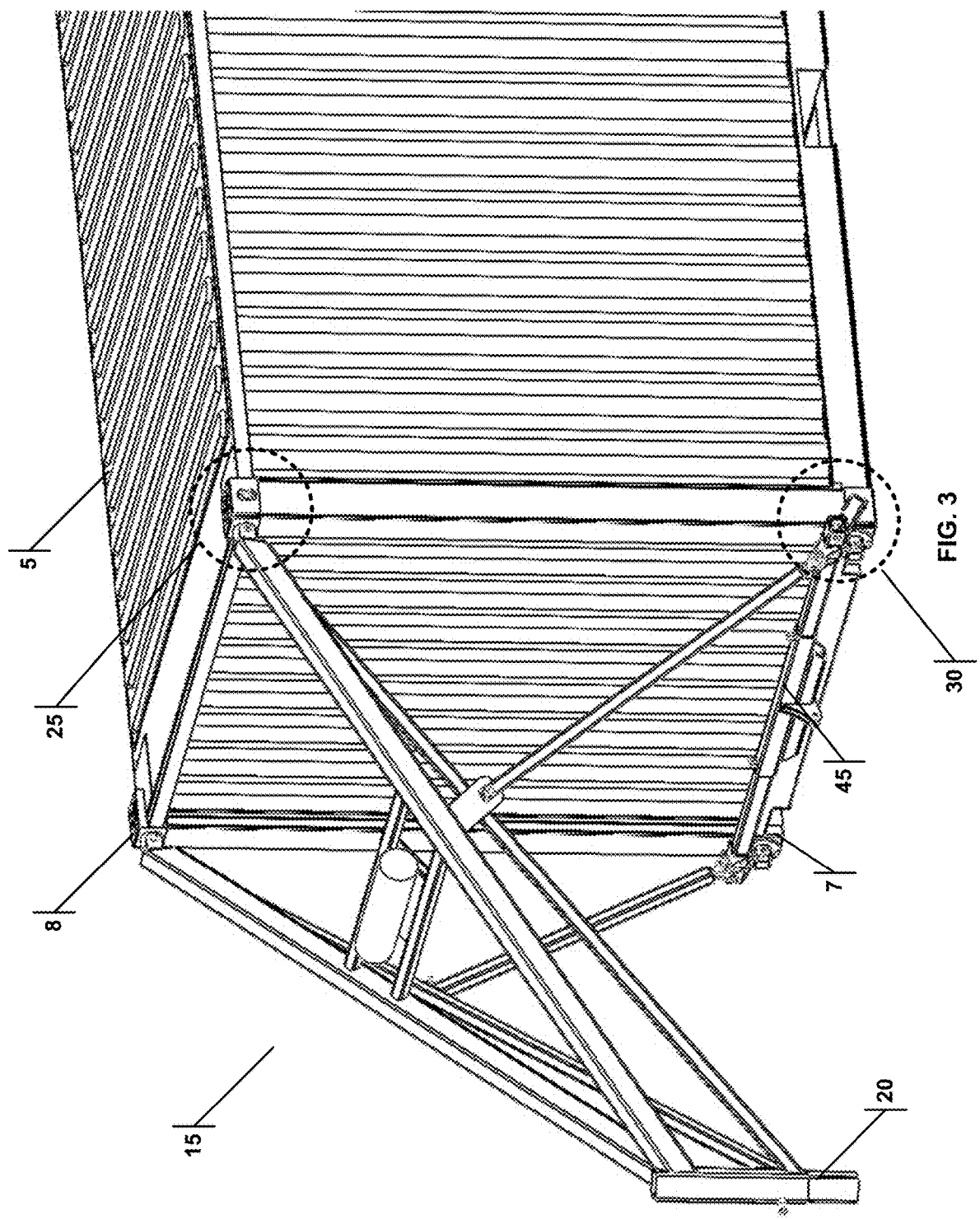
FIG. 3 is an enlarged view of the V-Lift frame connected to the container.
Figure 4:
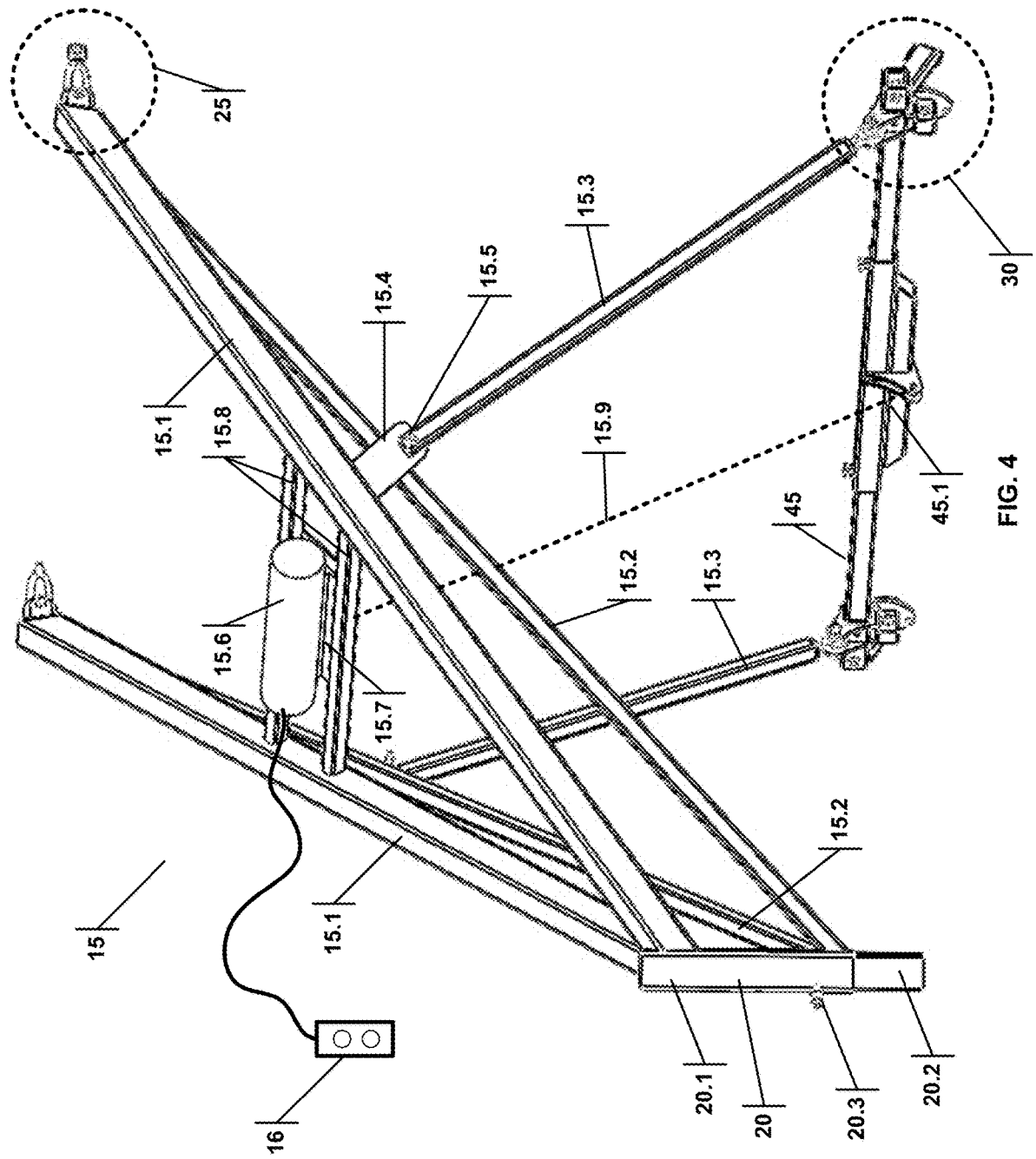
FIG. 4 is an isometric view of the V-Lift frame.
Figure 5:
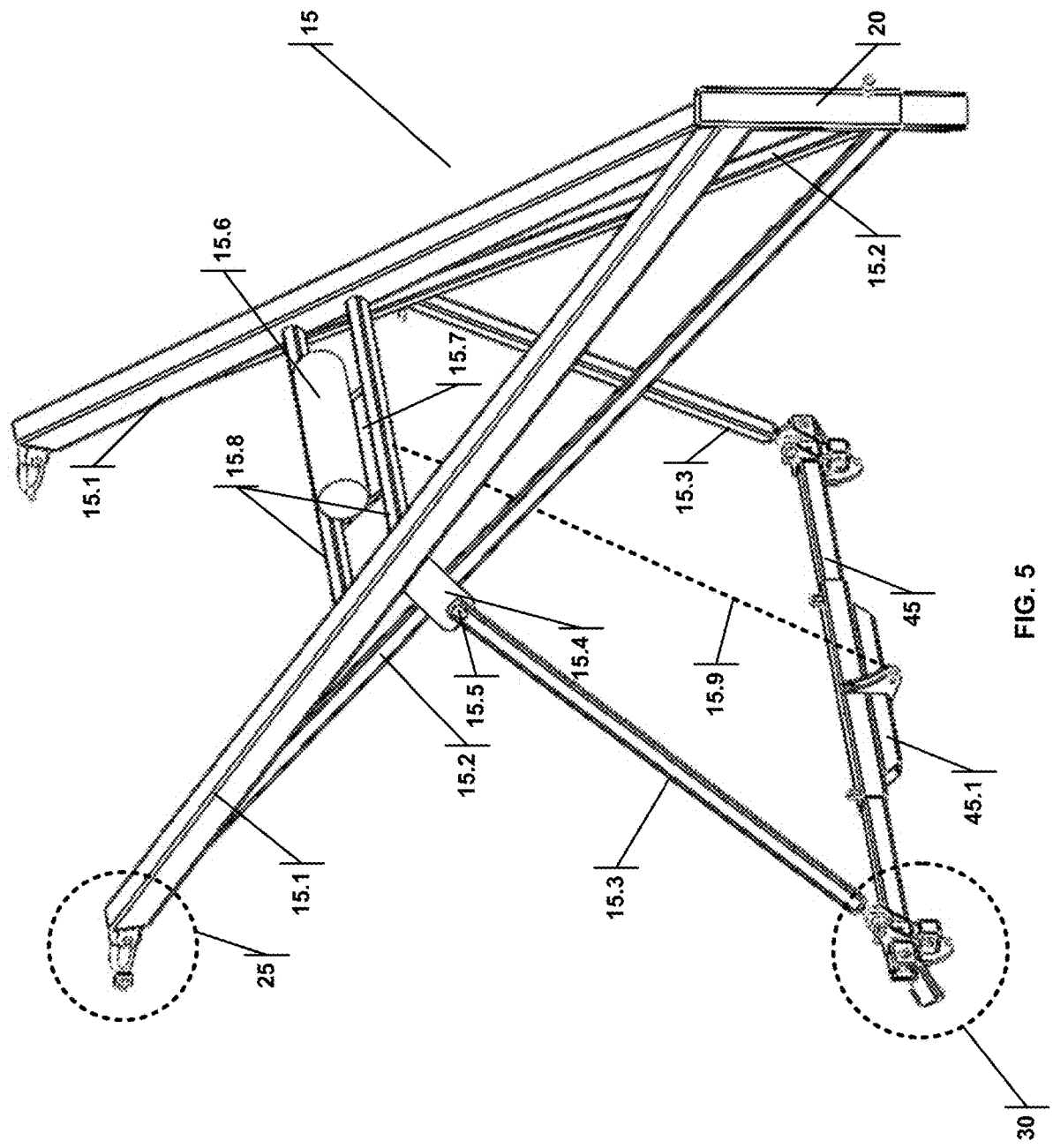
FIG. 5 is an isometric view of the V-Lift frame.
Figure 6:
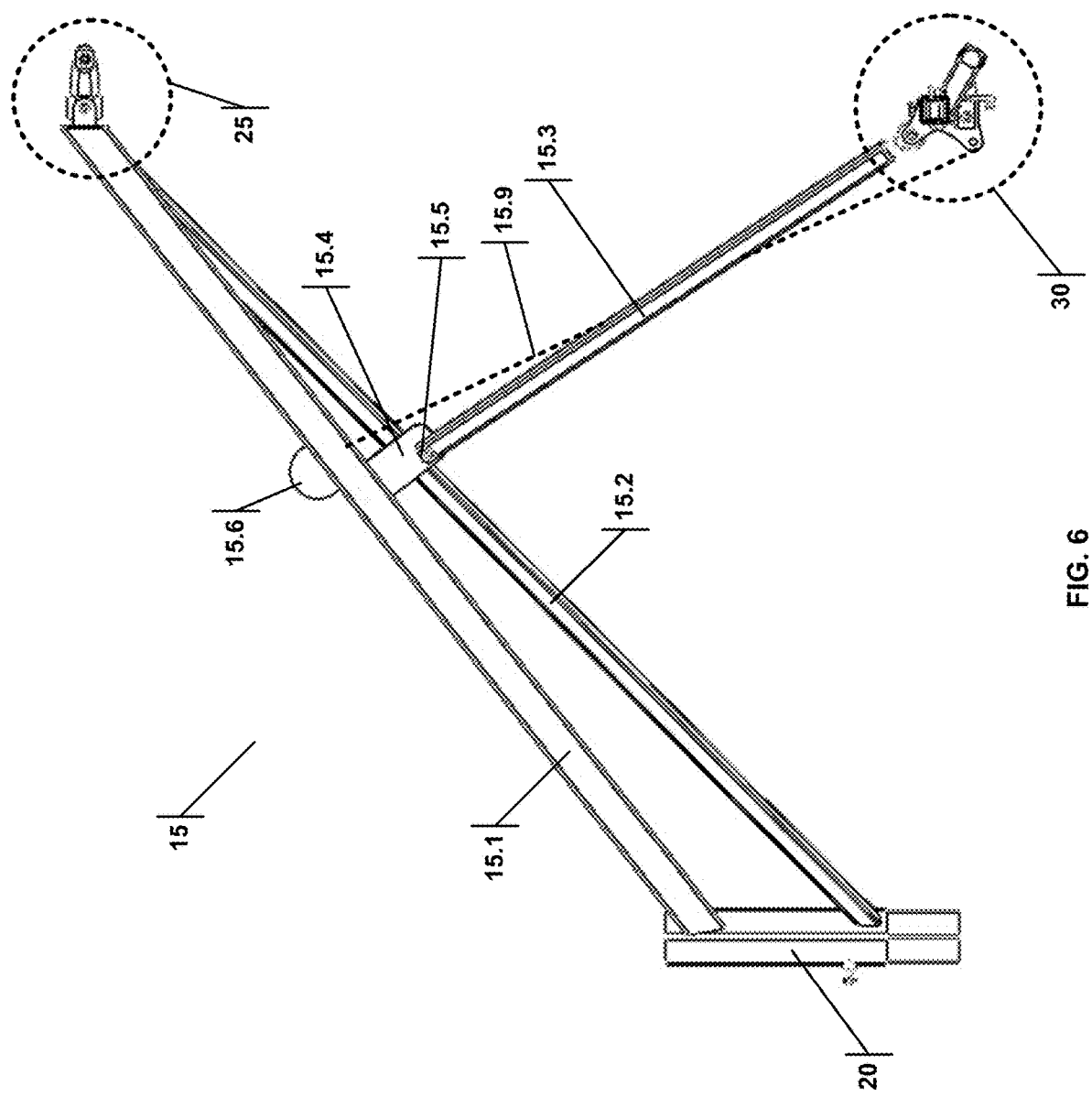
FIG. 6 is a side view of the V-Lift frame.
Figure 7:
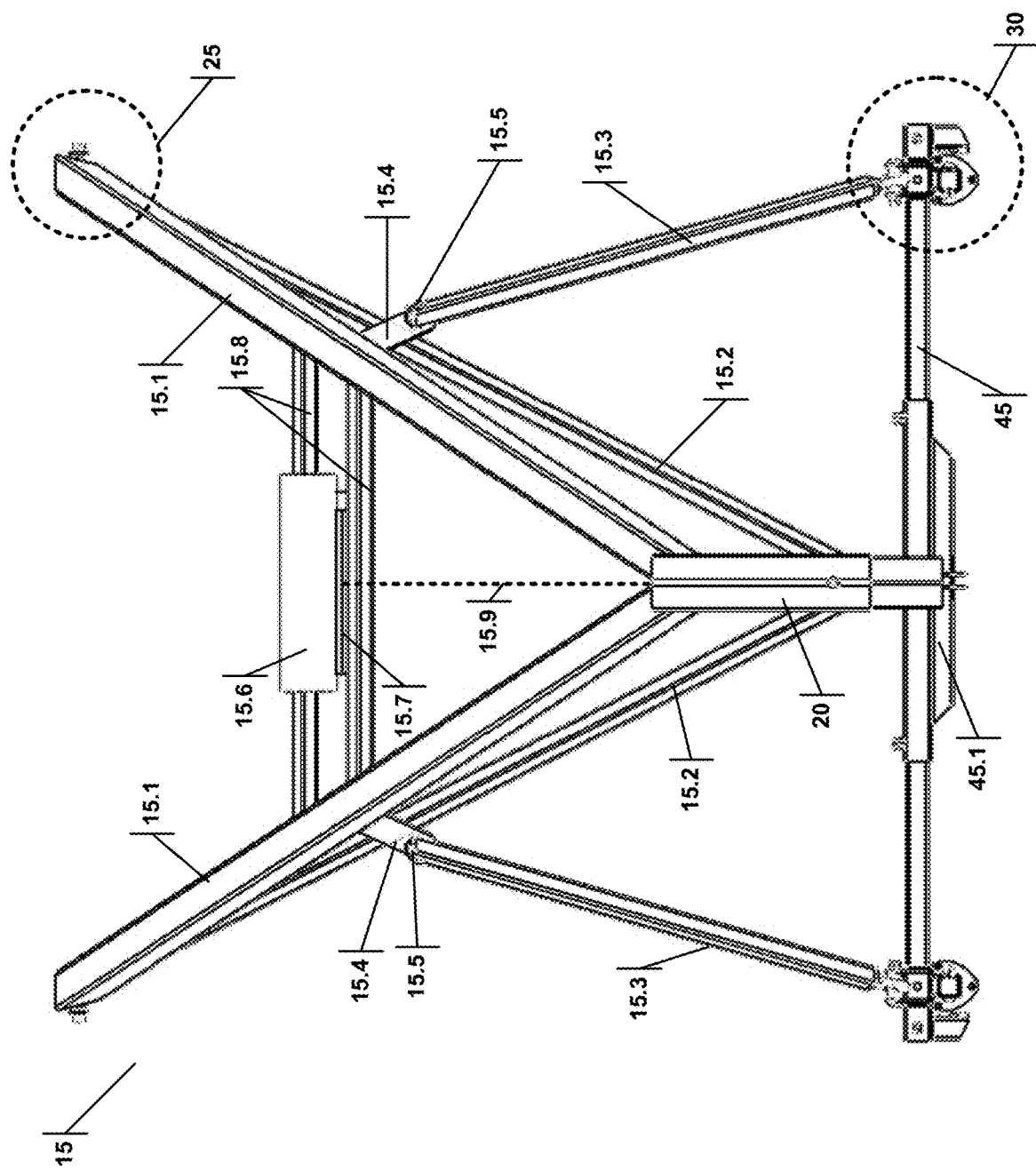
FIG. 7 is a front view of the V-Lift frame.

FIGS. 2 and 3 illustrate in more detail the connection of the V-Lift frame 15 with the container mounting blocks 7,8 through the top block connection assembly 25 and the bottom block connection assembly 30.

FIGS. 4 through 8 illustrate the V-Lift frame 10 in greater detail. Specifically, the gooseneck 20 connects to the top V-Lift frame bars 15.1 that extend away from the gooseneck and have the top block connection assembly 25 at the distal end of each V-Lift frame bar 15.1. Also connected to and extending from the gooseneck 15 are the bottom V-Lift frame bars 15.2 that connect to the top V-Lift bars 15.1 near the distal end. Cross supports 15.8 extend between and connect to the top V-Lift frame bars 15.1, forming a strong and rigid A-frame. Strut mounting plates 15.4 may be connected to the top V-Lift Frame bars 15.1, and extending from those plates are struts 15.3. A bottom block connection assembly 30 is connected to the end of each strut 15.3. A cross bar 45 extends between the bottom block connection assemblies 30, providing more rigidity to the V-Lift frame 15. A winch plate 15.7 may be connected to the cross supports 15.8, supporting a winch 15.6, which may include an electrical motor and its controller (16).

The cross bar 45 includes a cross-bar eyelet bracket 45.1, onto which a winch cable 15.9 may be attached (at position 47 in FIGS. 8 and 22A), allowing the winch 15.6 to lift the cross bar 45, and consequently the container. The gooseneck 20 may have two sections (20.1, 20.2), one of which slides into the other. A bolt 20.3 may be tightened to securely fix the two sections together. This allows the gooseneck 20 to be lengthened or shortened to accommodate different heights.

Figure 9A:
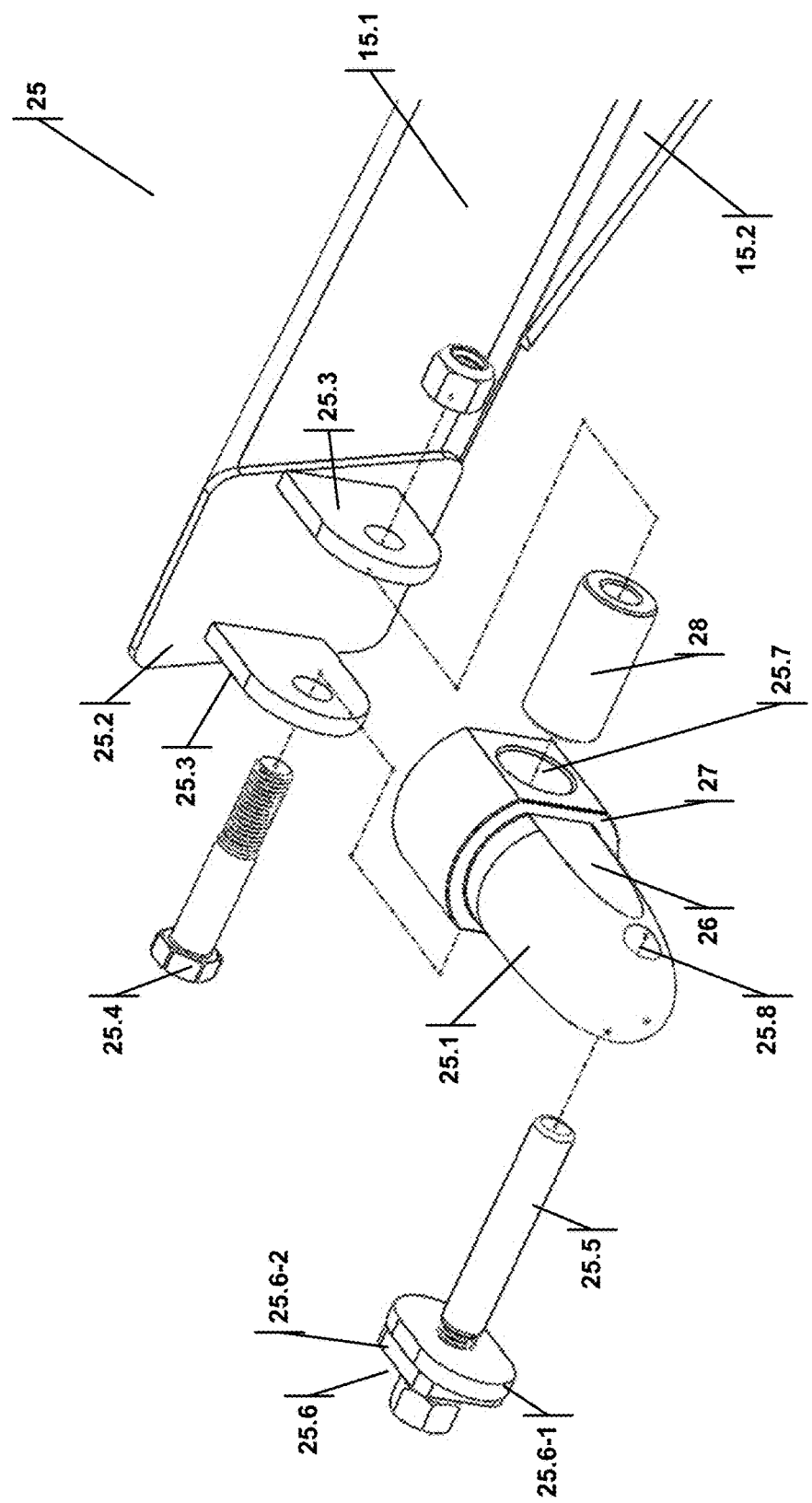
FIG. 9A is an exploded isometric view of the top block connection assembly.
Figure 9B:
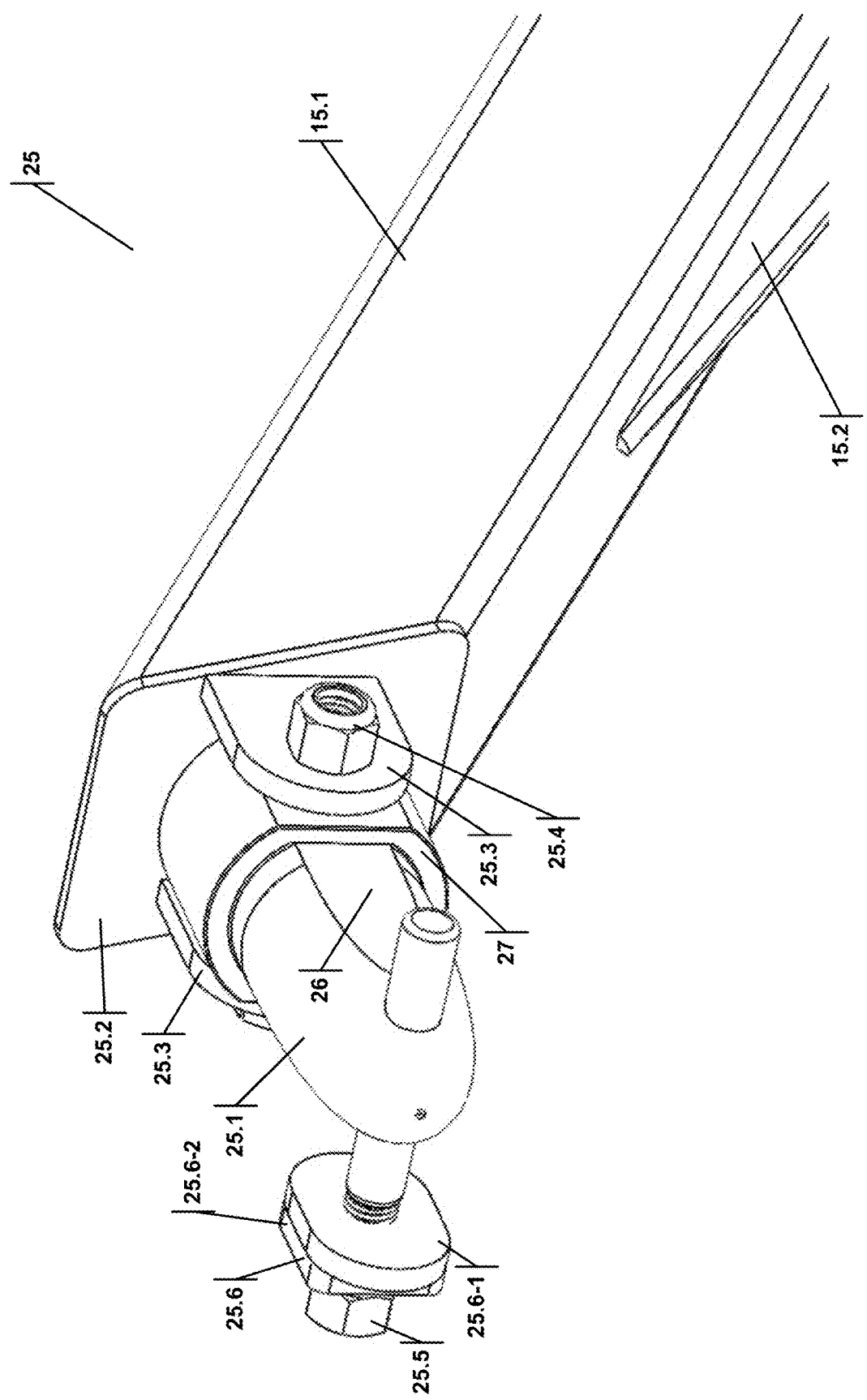
FIG. 9B is an isometric view of the top block connection assembly.
Figure 11:
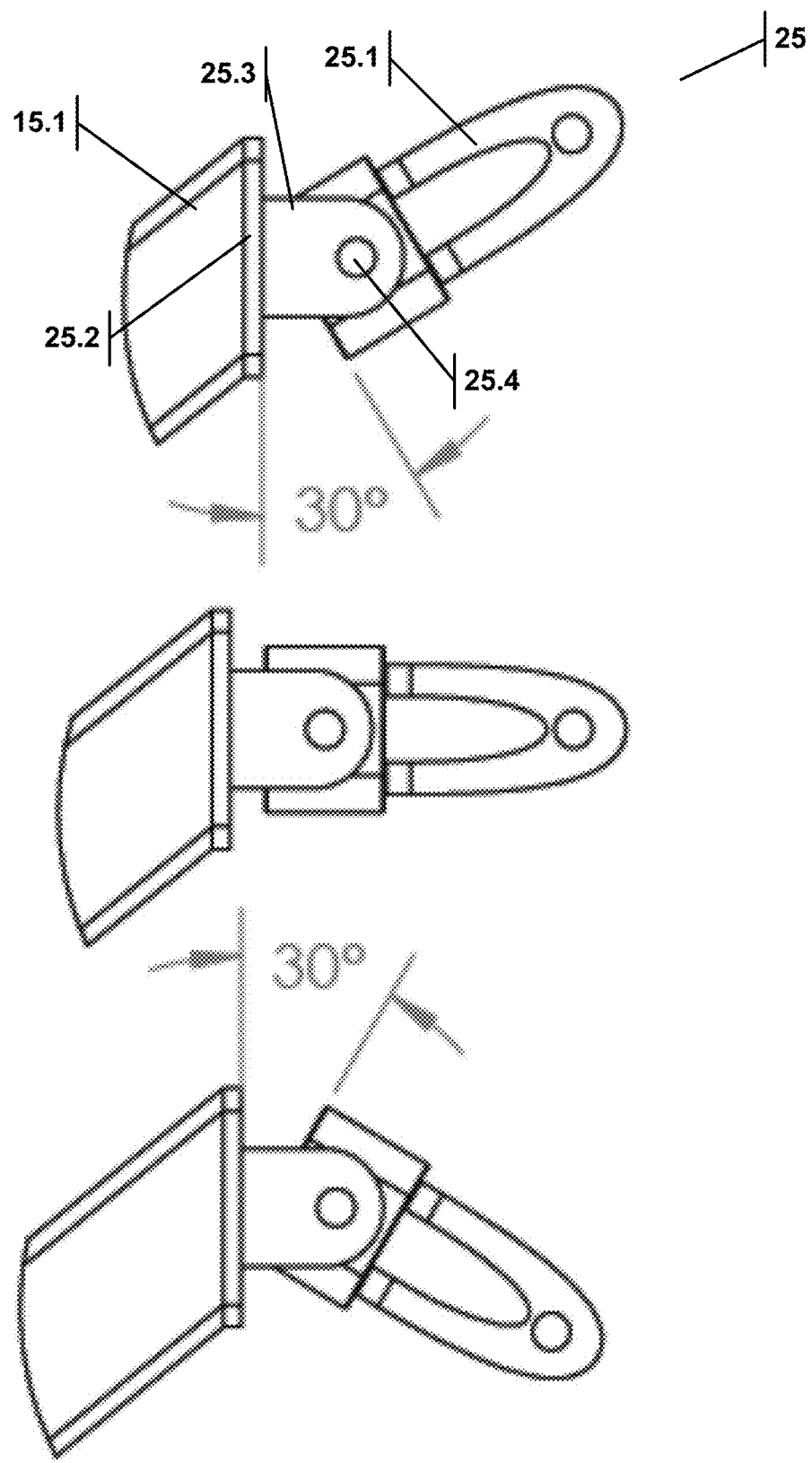
FIG. 11 is a side view of the top block connection assembly, illustrating the rotation of the upper plug.

FIGS. 9A though 10 detail the top block connection assembly 25. Located at the end of each top v-Lift Frame bar 15.1, it includes plug pivot plates 25.3 extending from a frame end plate 25.2. The plug pivot plates 25.3 support a pivot bolt 25.4 that can be inserted through the upper plug 25.1, which may have bearings 28. A plug mounting bolt 25.5 extends from the upper plug 25.1. A mounting bolt flange 25.6 connects to the plug mounting bolt 25.5 and secures the top block connection assembly 25 to the top container mounting block 8. The upper plug 25.1 may pivot about the plug pivot bolt 25.4, as shown in FIG. 11. The rotational freedom assists when installing the V-Lift frame to the container and relieves stress between the container 5 and the V-Lift frame 15 during transit. The upper plug 25.1 may be an oblong dome shape with flat sides 26 that assist in the alignment and insertion into the top mounting block holes. The upper plug 25.1 may also have an expanded rim 27 (FIG. 12A) with a diameter that is larger than the top mounting block hole, such that the expanded rim 27 prevents the upper plug 25.1 from further insertion into the top mounting block hole.

Figure 12A:
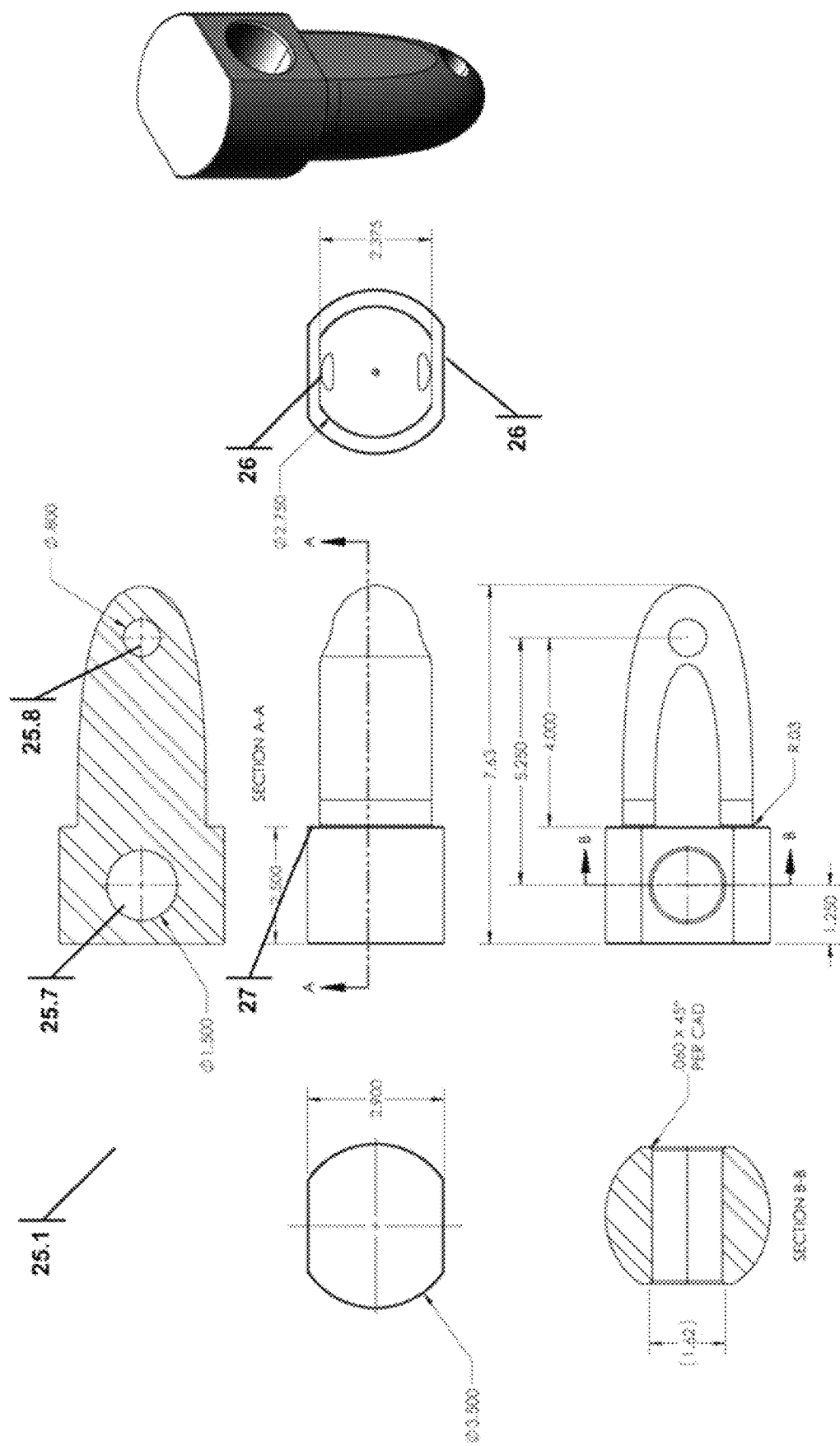
FIG. 12A is a detailed schematic with dimensions of the upper plug.
Figure 12C:
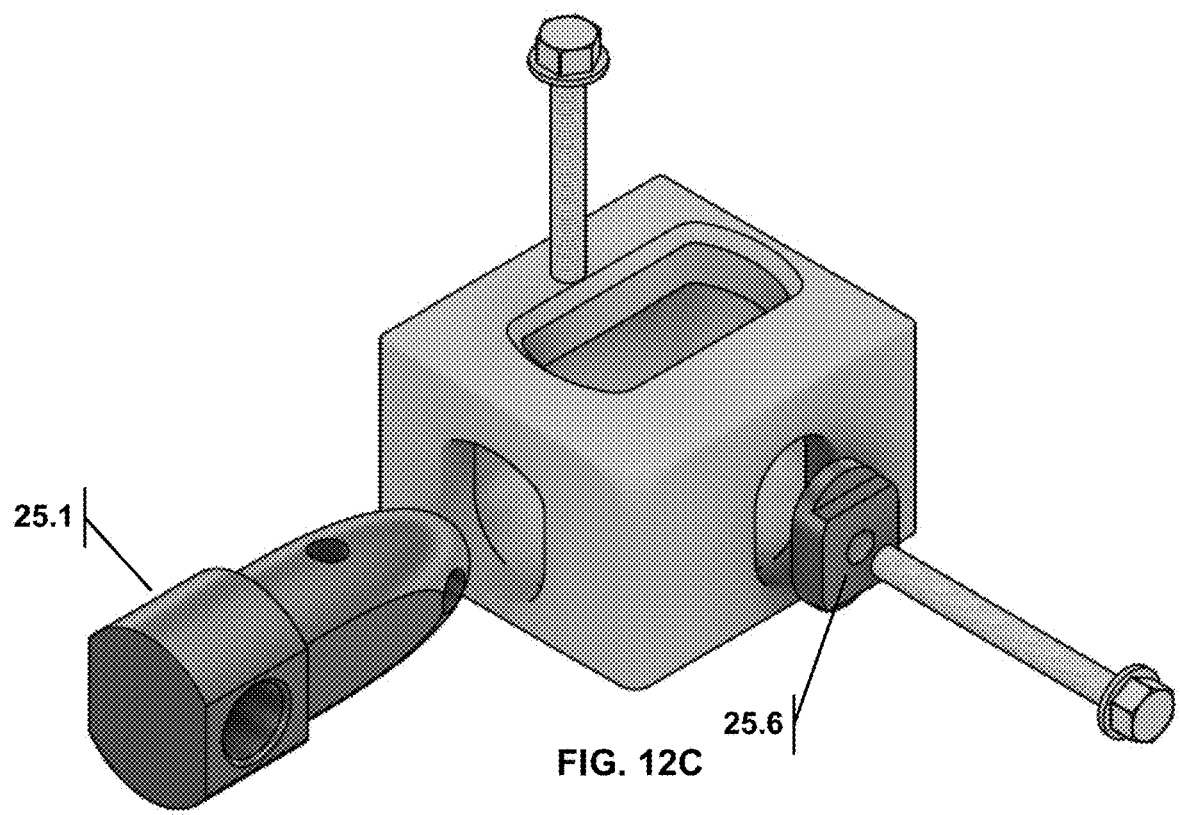
FIG. 12C illustrates the upper plug of FIG. 12B in an exploded view prior to installation into the container mounting block.
Figure 12D:
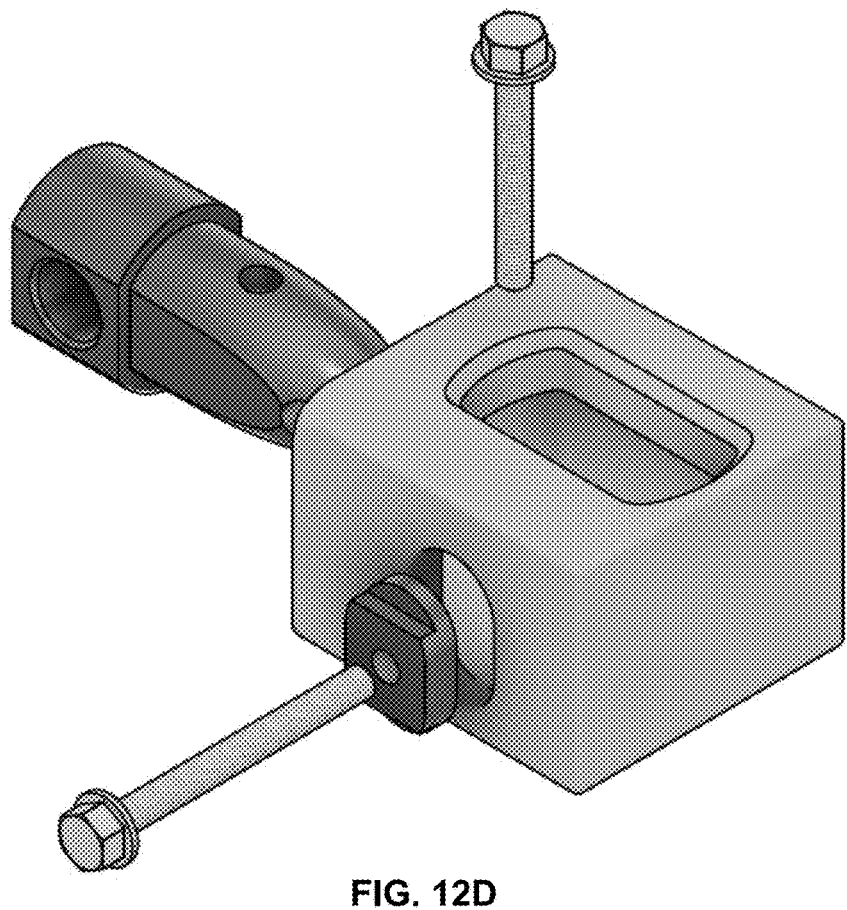
FIG. 12D illustrates the upper plug of FIG. 12B in an exploded view prior to installation into the container mounting block.
Figure 12E:
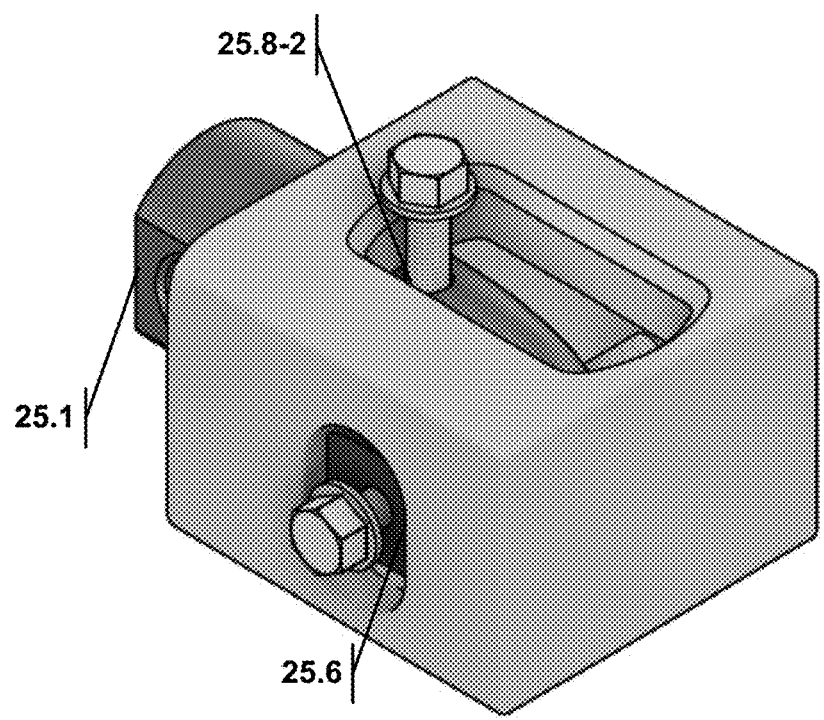
FIG. 12E illustrates the upper plug of FIG. 12B secured in the container mounting block.
Figure 12F:
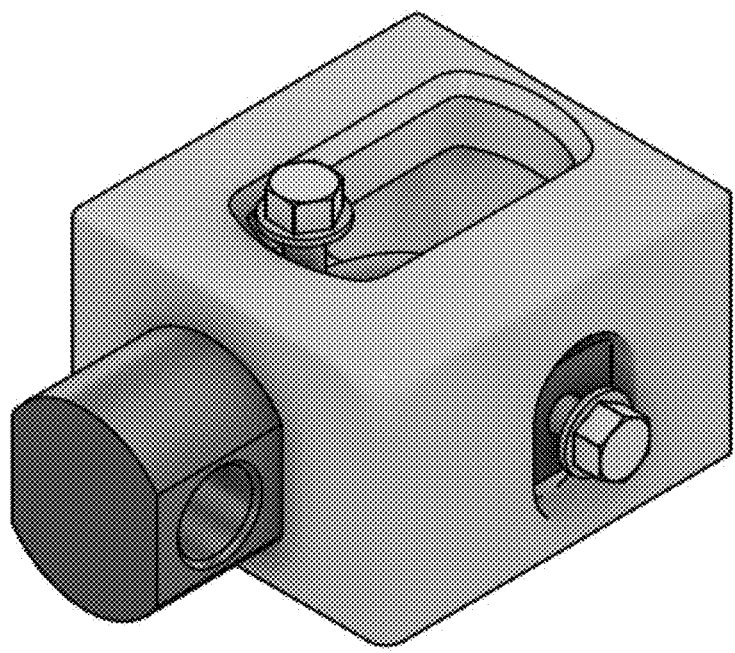
FIG. 12F illustrates the upper plug of FIG. 12B secured in the container mounting block.
Figure 12H:
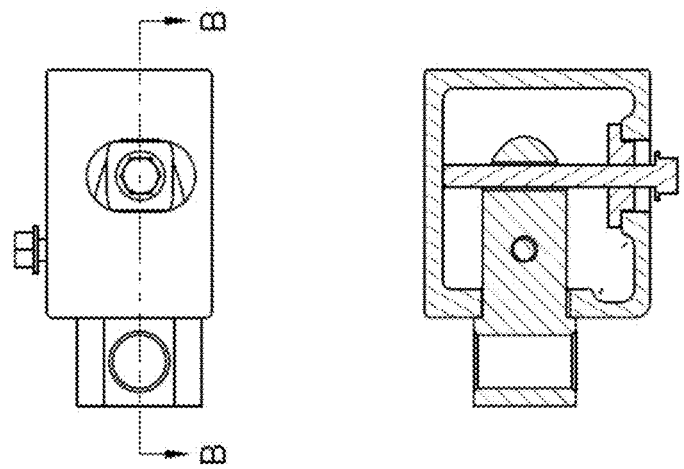
FIG. 12H illustrates the cross-sectional view taken along line B-B of the assembled view of the upper plug of FIG. 12B.
Figure 12G:
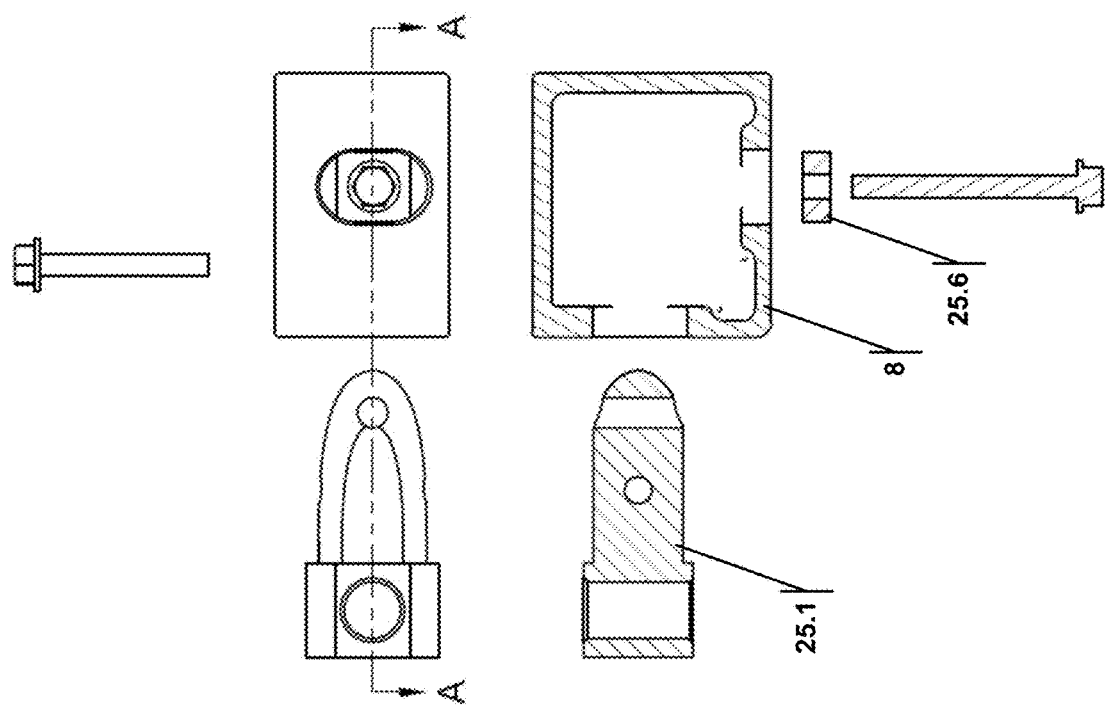
FIG. 12G illustrates the cross-sectional view taken along line A-A of the exploded view of the upper plug of FIG. 12B.

The upper plug 25.1 is shown in detail with preferred dimensions in FIG. 12A. Holes 25.7 and 25.8 receive the plug pivot bolt 25.4 and the plug mounting bolt 25.5, respectively. FIG. 12B illustrates the upper plug 25.1 with a third mounting hole 25.8-2. FIGS. 12C-12H illustrate the installation of the upper plug 25.1 with a third mounting hole 25.8-2 into a container mounting block.

Figure 10:
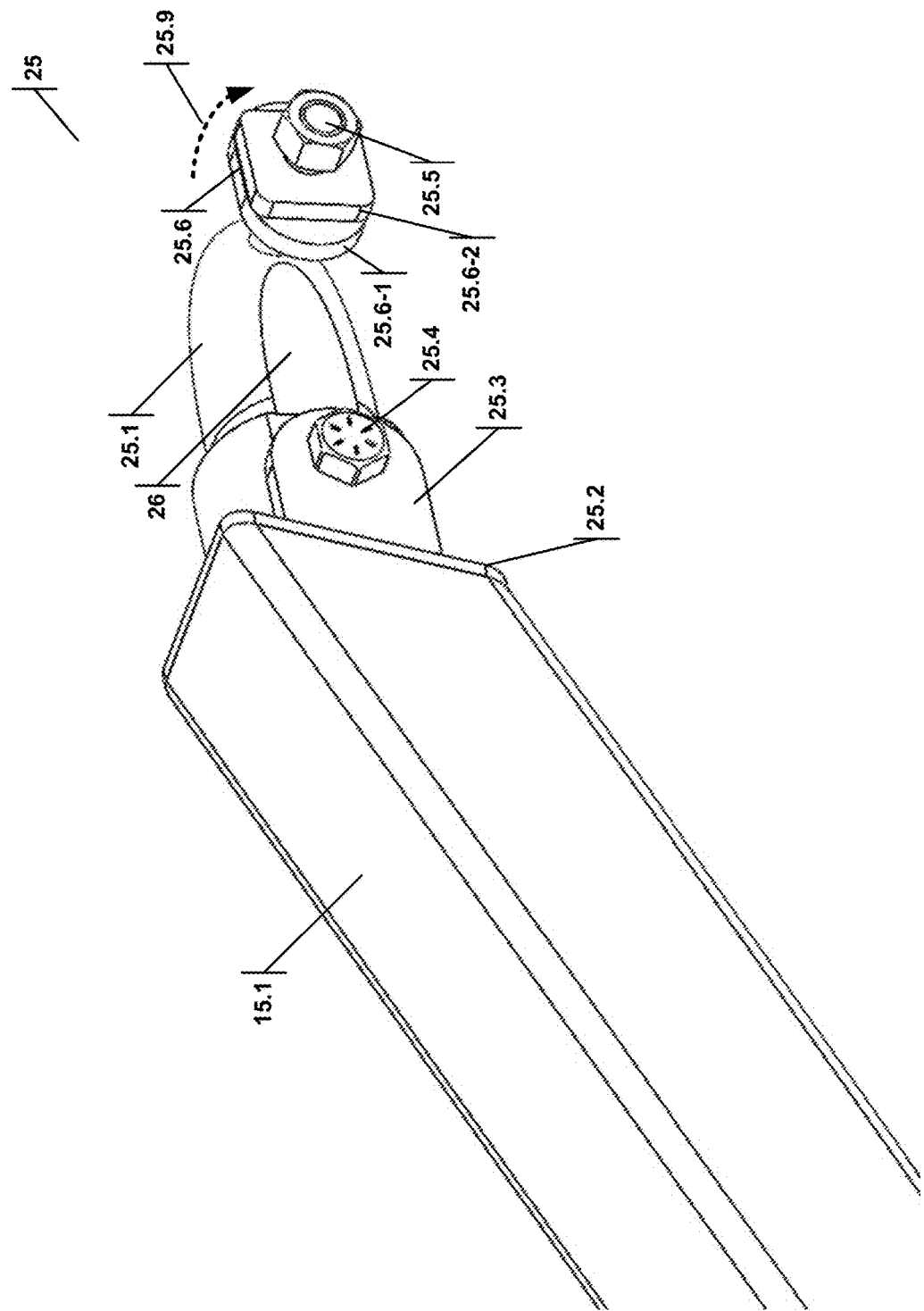
FIG. 10 is an isometric view of the top block connection assembly.
Figure 13:
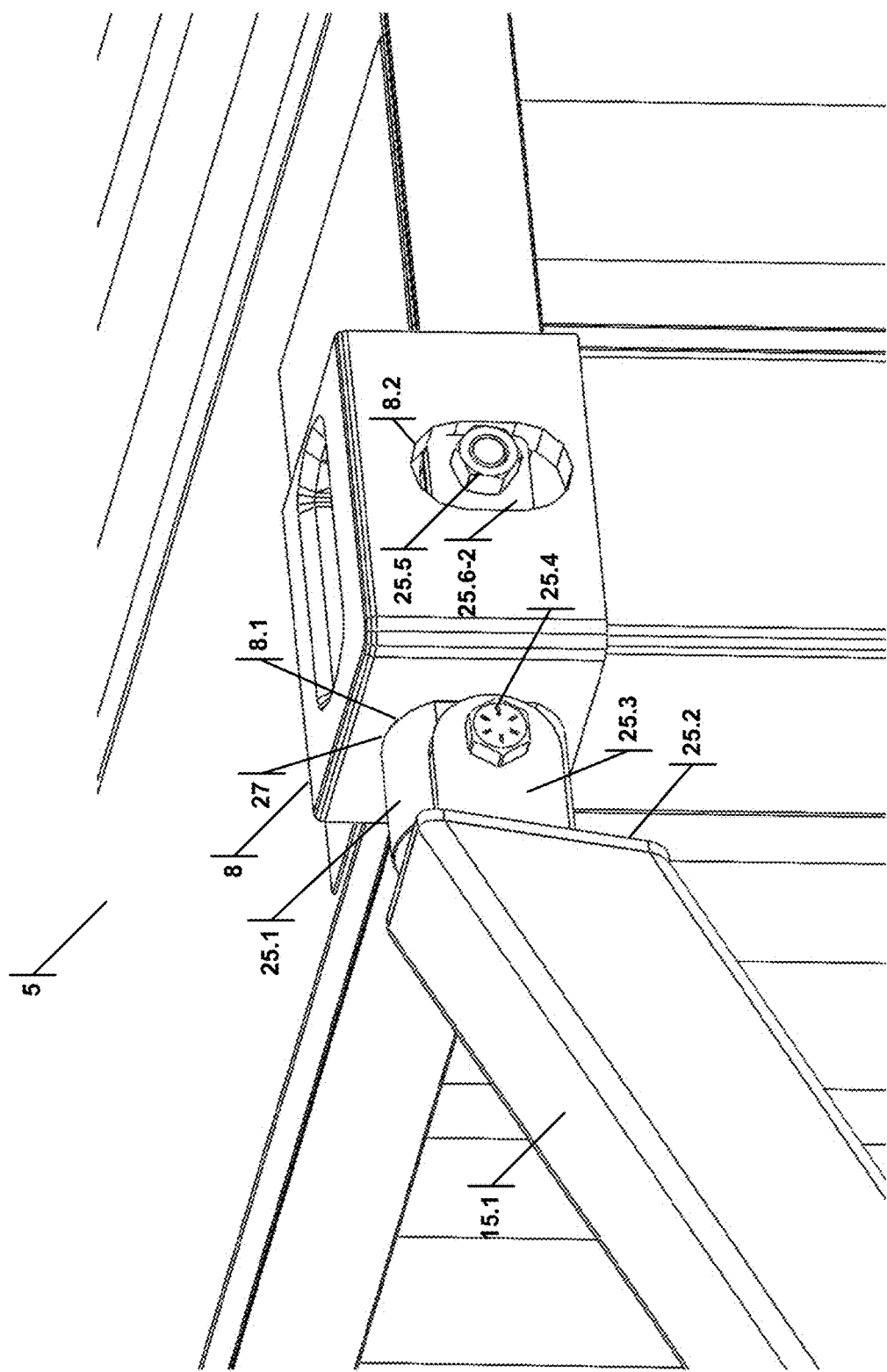
FIG. 13 is a side isometric view of the top block connection assembly connected to the top container mounting block of a container.
Figure 13C:
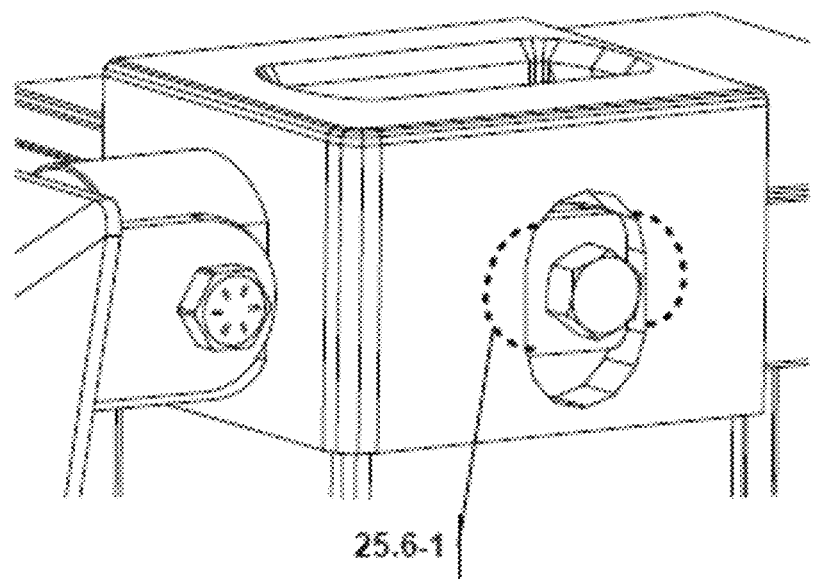
FIG. 13C illustrates the second rotational orientation used in the seating configuration of the flange.

FIGS. 13 through 16 illustrate the top block connection assembly 25 connected to the top container mounting block 8 of a container 5. The upper plug 25.1 is inserted into the top mounting block hole 8.1; then, the plug mounting bolt 25.5 is inserted through the top mounting block hole 8.2 and affixed to the upper plug 25.1. Importantly, the plug mounting bolt flange 25.6 must be aligned with the mounting hole 8.2 so that the plug mounting bolt 25.5 can be fully inserted and connected to the upper plug 25.1, shown in FIG. 13A. Once it is inserted, the flange 25.6 may be rotated (see arrow 25.9, FIG. 13B and FIG. 10) by turning the plug mounting bolt 25.5, thus forcing the mounting bolt 25.5 against the back interior wall of the top container mounting block 8, and also rotating the first (obstruction) portion of the flange 25.6-1 to prevent the bolt 25.5 from escaping through the hole 8.2, and seating the second (seating) portion of the flange 25.6-2 within the hole 8.2, preventing the rotation of the flange 25.6 (see FIG. 13). As shown in FIG. 13C, the second (seating) portion of the flange 25.6-2 seats into the top mounting block hole 8.2. Because the plug mounting bolt 25.4 is threaded, once the second (seating) portion of the flange 25.6-2 seats within the hole 8.2, turning the bolt (arrow 25.10, FIG. 13D) causes the flange 25.6 to laterally travel along the plug mounting bolt 25.4 (arrow 25.11, FIG. 13D), pressing the first (obstruction) portion of the flange 25.6-1 against the interior wall 8.2-1 of the mounting block, and providing a secure connection of the top block connection assembly 25 to the container 5. In FIGS. 13A-13D, the flange 25.6 secures a structure (such as the upper plug 25.1) to the interior of the mounting block (7, 8).

Figure 13D:
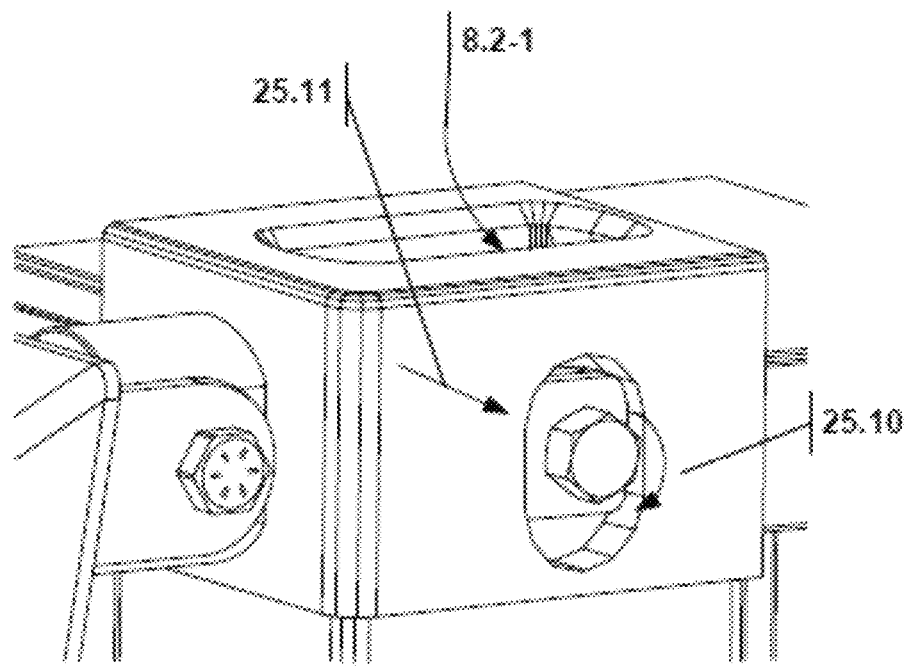
FIG. 13D illustrates the secure configuration of the flange.
Figure 13E:
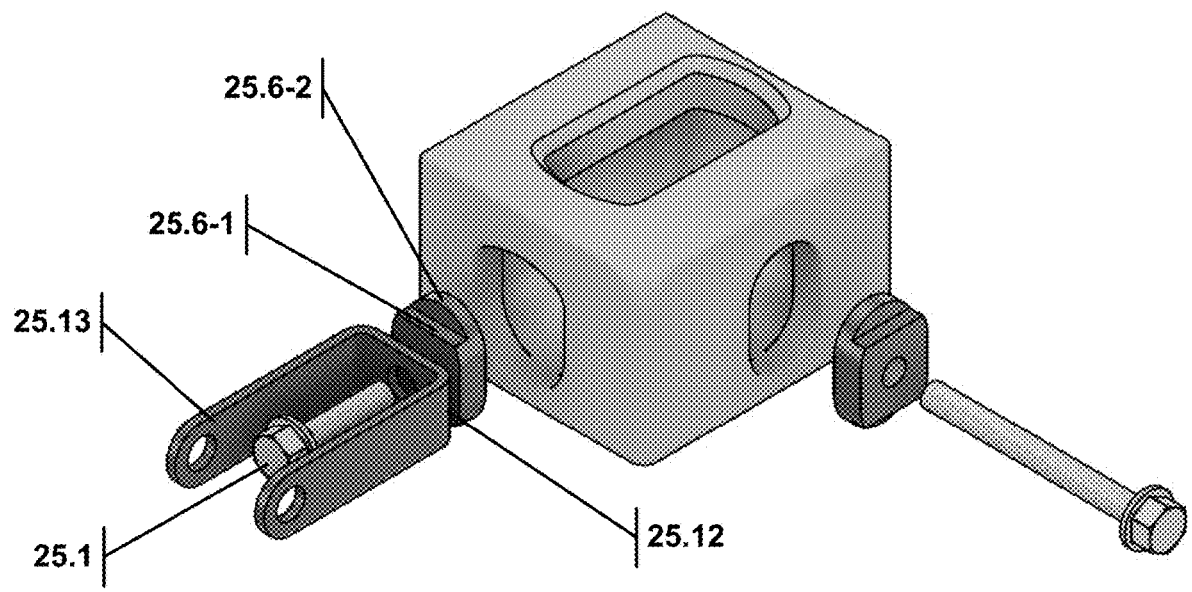
FIG. 13E illustrates a mounting bracket used with the flange, in an exploded view.
Figure 13F:
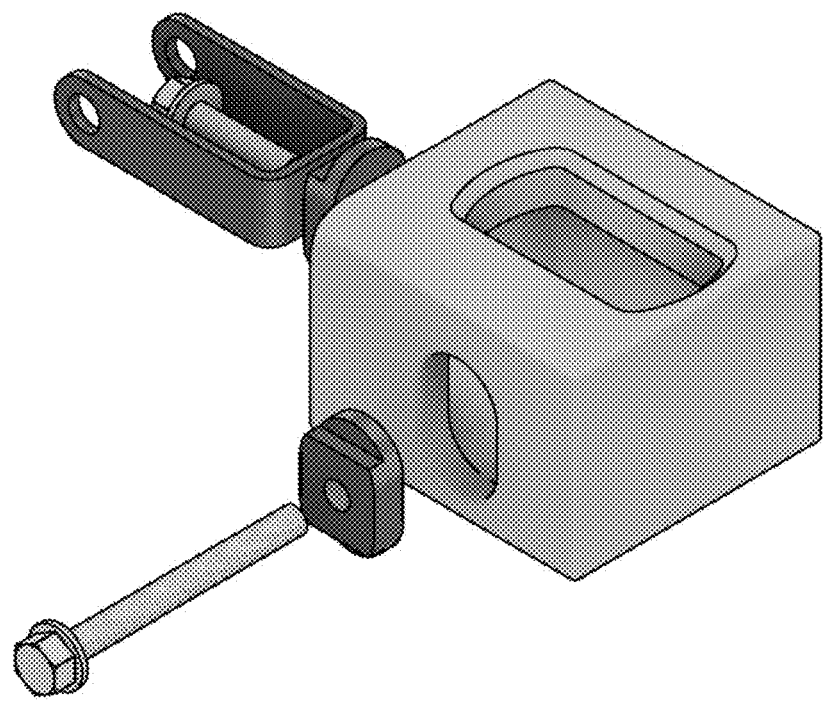
FIG. 13F illustrates the mounting bracket with the flange, in an exploded view.
Figure 13G:
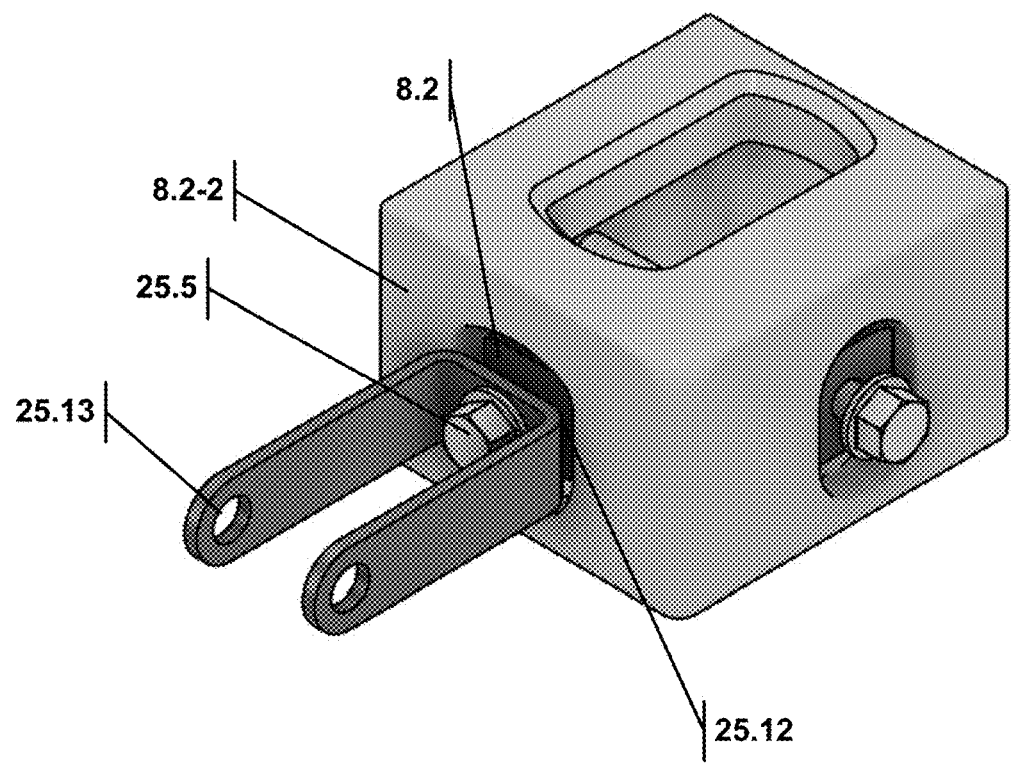
FIG. 13G illustrates the mounting bracket secured in the container mounting block.
Figure 13H:
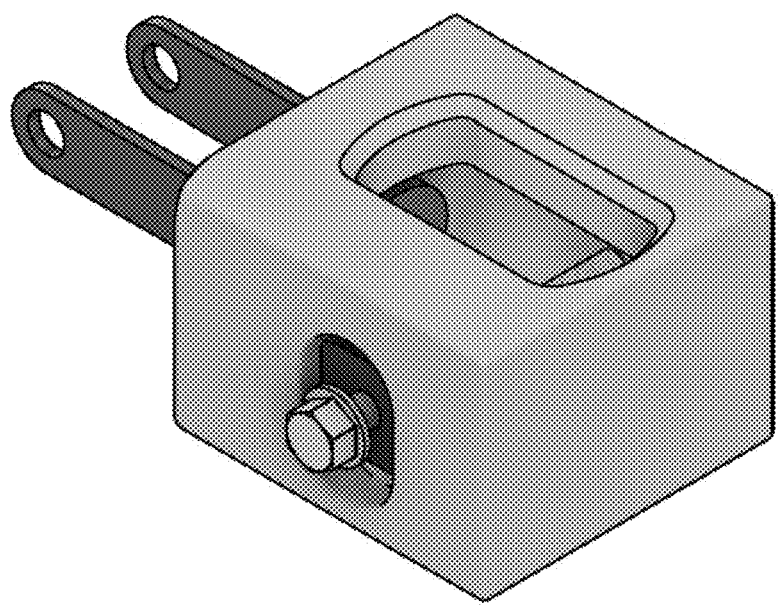
FIG. 13H illustrates the mounting bracket secured in the container mounting block.
Figure 13Q:
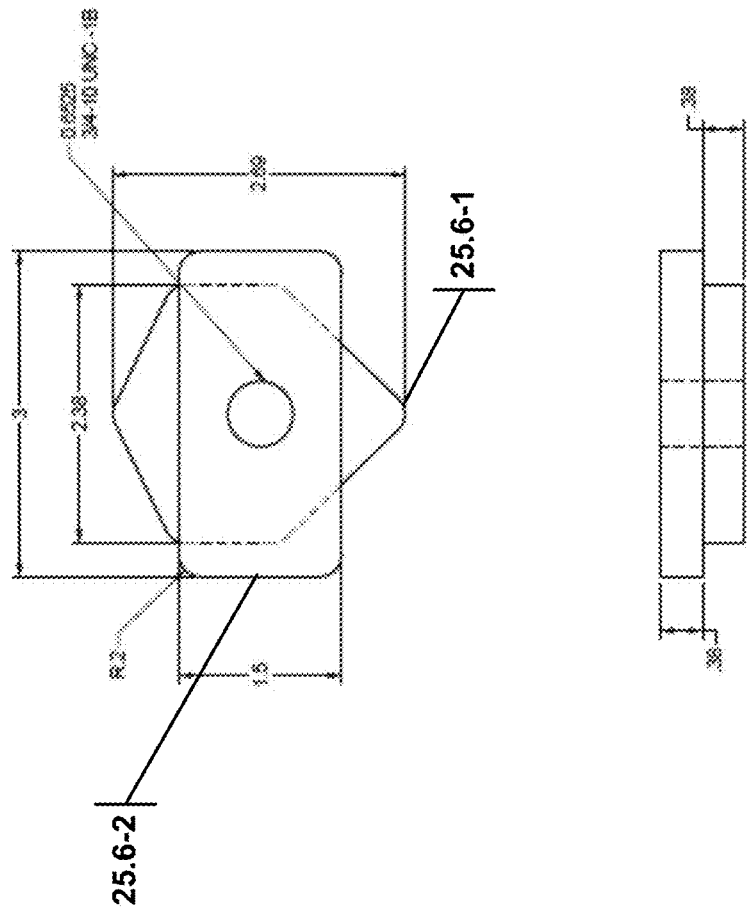
FIG. 13Q is a detailed schematic with dimensions of the flange of FIG. 13P.
Figure 13P:
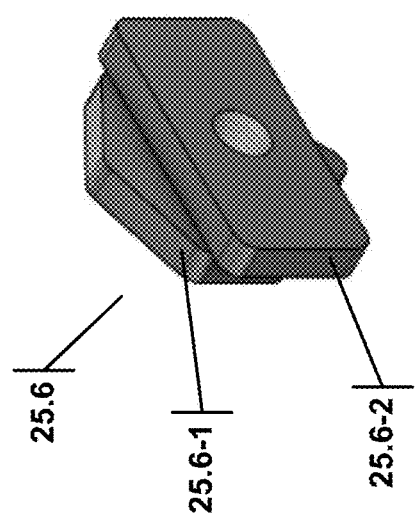
FIG. 13P illustrates a second design for the flange.
Figure 13R:
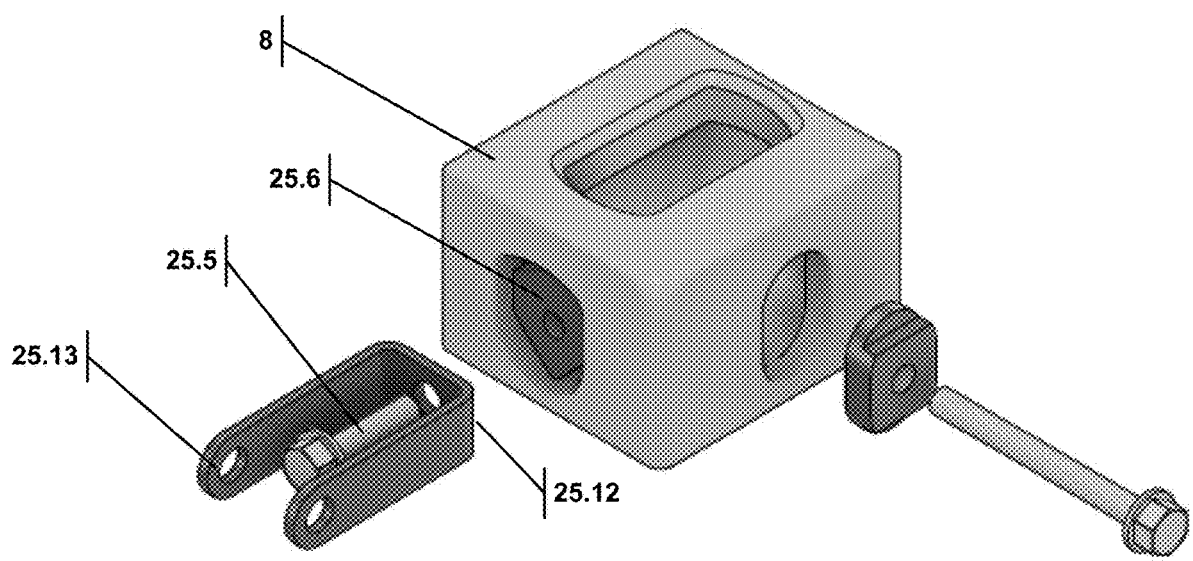
FIG. 13R illustrates the mounting bracket with the flange of FIG. 13P, in an exploded view.
Figure 13S:
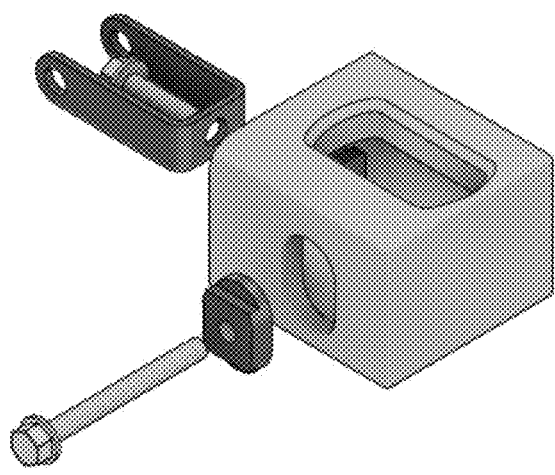
FIG. 13S illustrates the mounting bracket with the flange of FIG. 13P, in an exploded view.
Figure 13T:
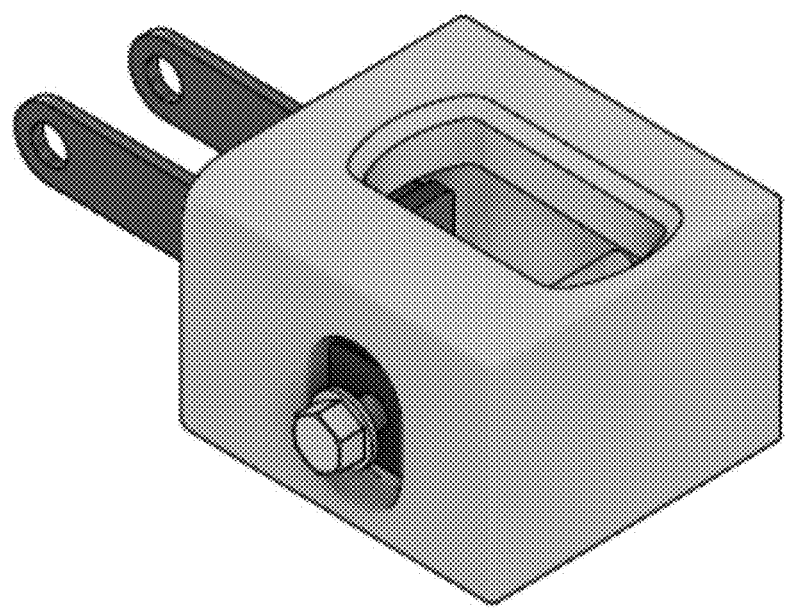
FIG. 13T illustrates the mounting bracket secured in the container mounting block with the flange of FIG. 13P.
Figure 13U:
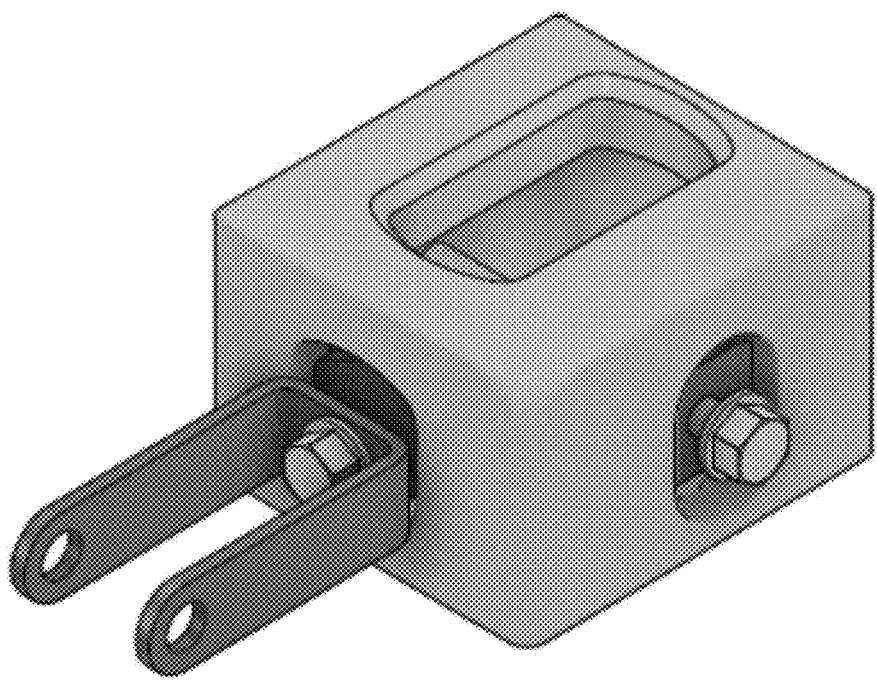
FIG. 13U illustrates the mounting bracket secured in the container mounting block with the flange of FIG. 13P.
Figure 13X:
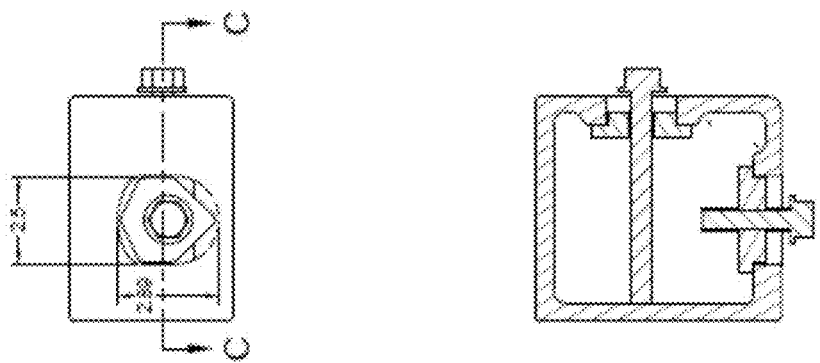
FIG. 13X illustrates the cross-sectional view taken along line C-C of the assembled view of the flange of FIG. 13P with a mounting bracket.
Figure 13W:
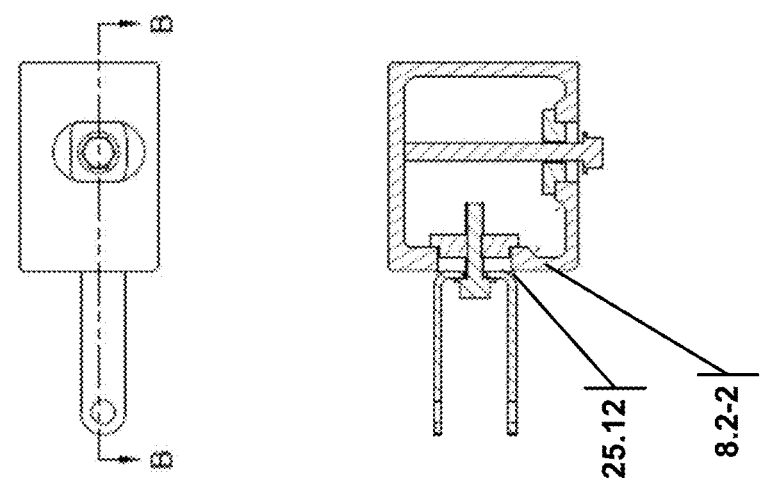
FIG. 13W illustrates the cross-sectional view taken along line B-B of the assembled view of the flange of FIG. 13P with a mounting bracket.
Figure 13V:
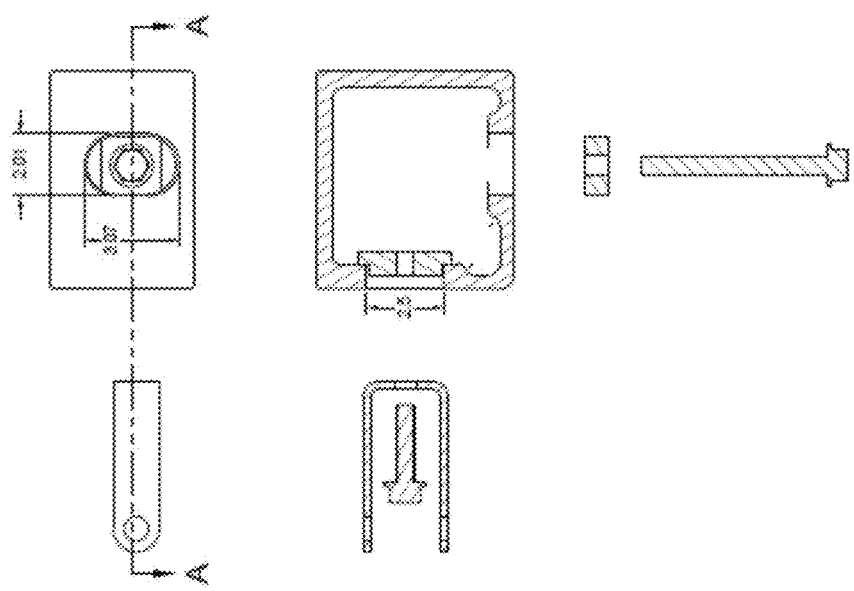
FIG. 13V illustrates the cross-sectional view taken along line A-A of the exploded view of the flange of FIG. 13P with a mounting bracket.
Figure 14:
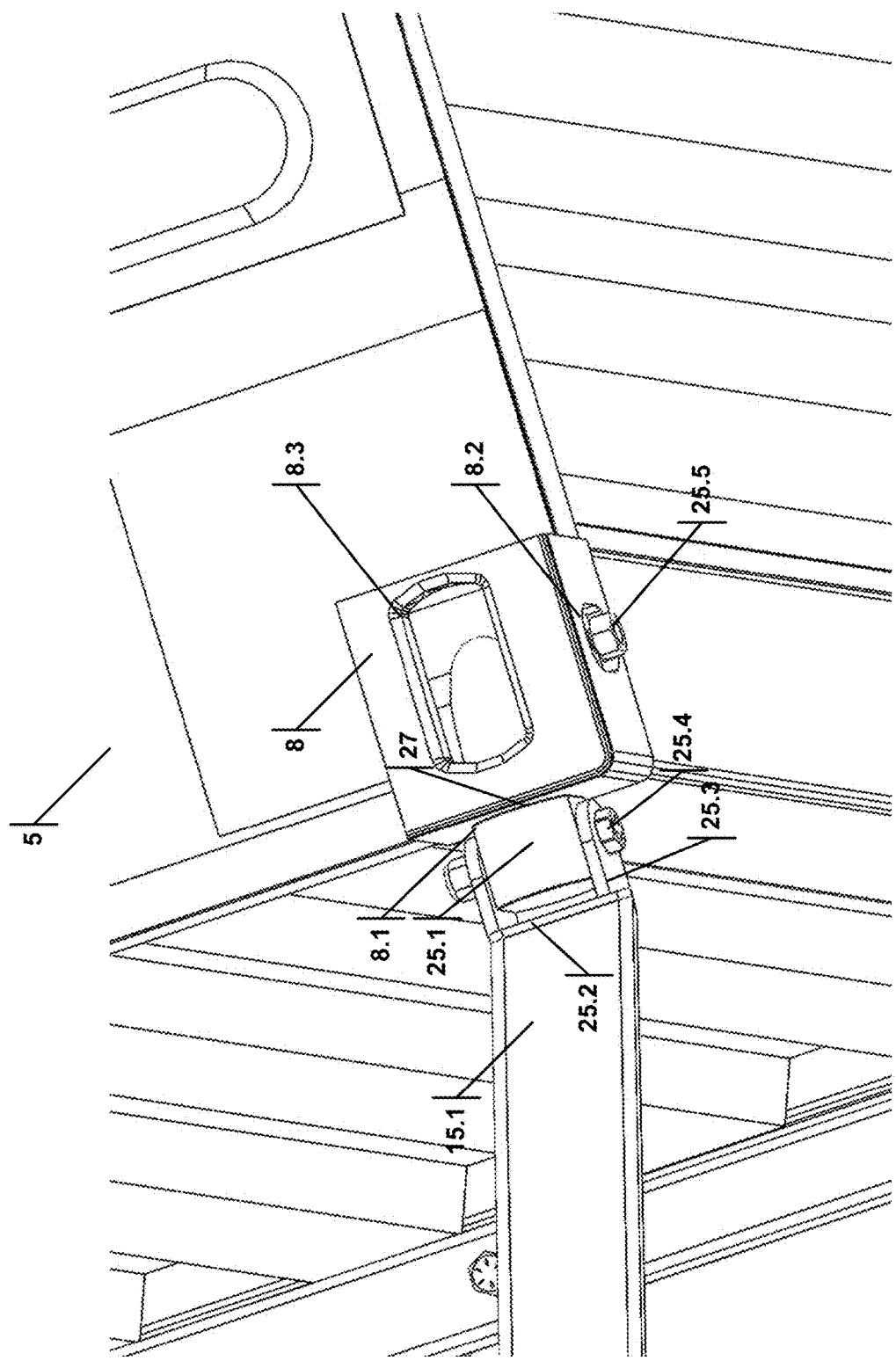
FIG. 14 is a top isometric view of the top block connection assembly of FIG. 13.
Figure 15:
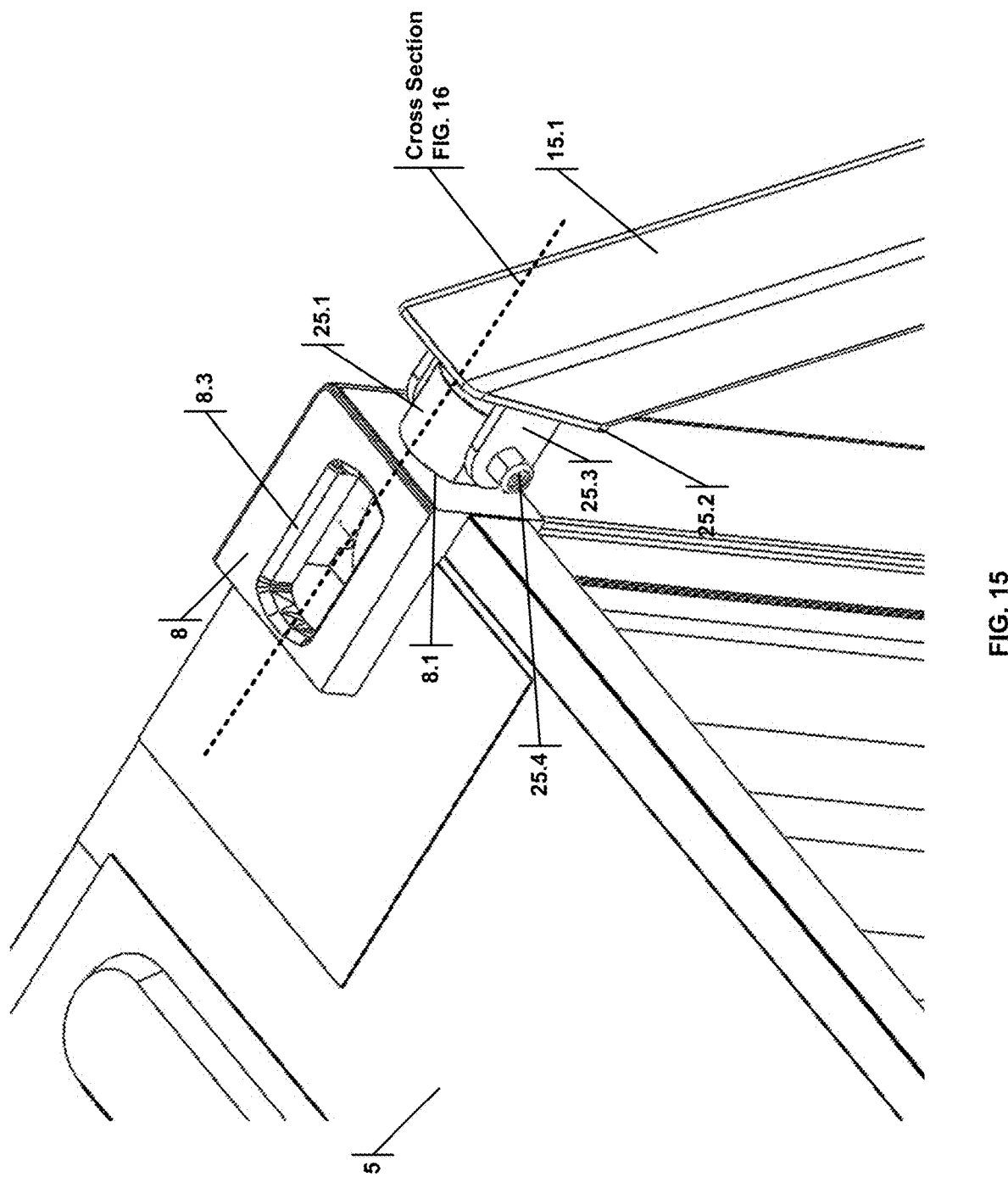
FIG. 15 is a top isometric view of the top block connection assembly of FIG. 13.
Figure 16:
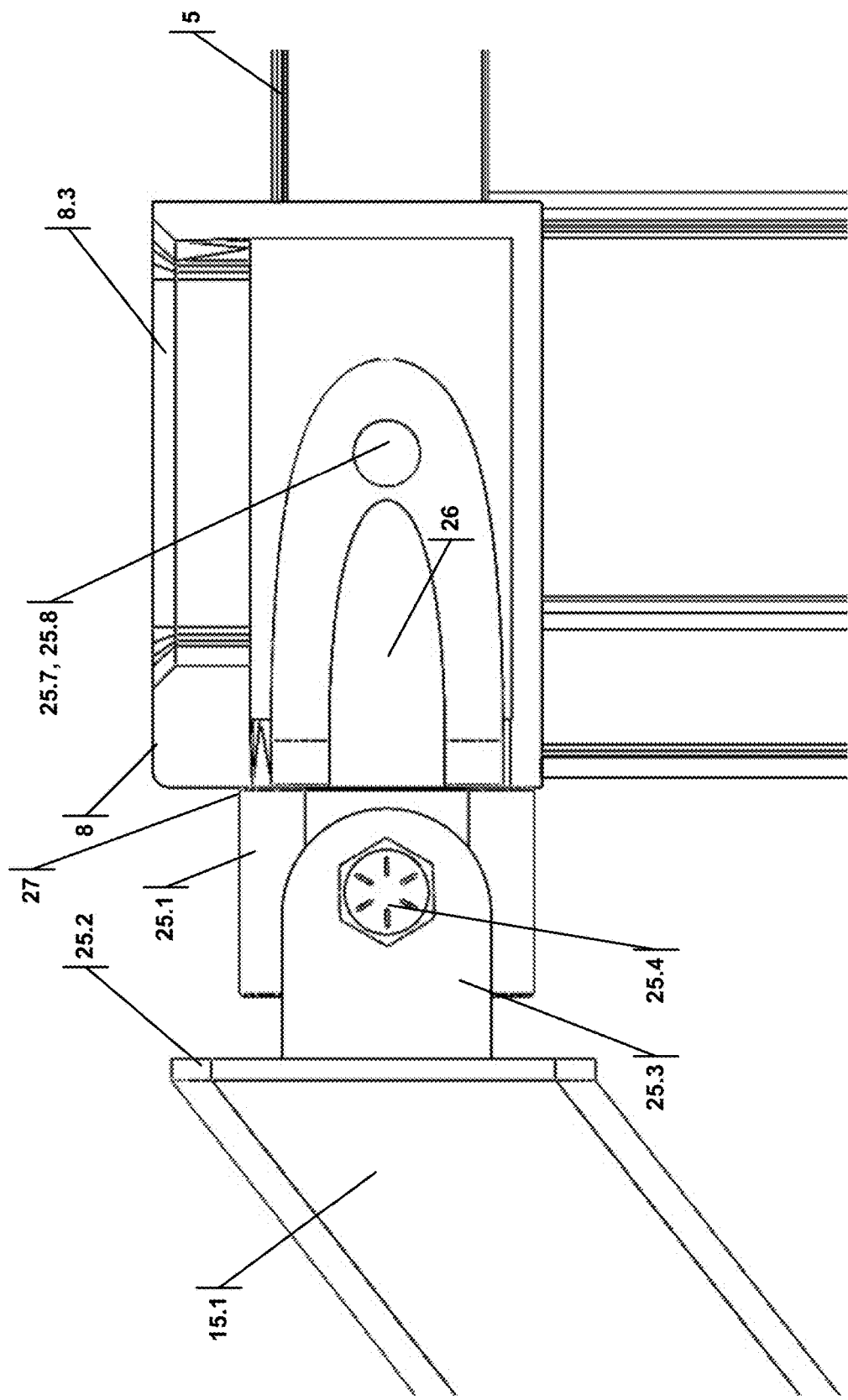
FIG. 16 is a side cross-sectional view of the top block connection assembly of FIG. 13.

As shown in FIGS. 13E and 13F, amounting bracket 25.12 with amounting structure 25.13 may be connected to the mounting bolt 25.1 and is securely fixed to the top container mounting block 8. In this embodiment, the mounting bracket 25.12 is constructed to press against an exterior wall of the mounting block 8.2-2 when in the secure configuration (see FIGS. 13G and 13H). FIGS. 13I-13K illustrate cross-sectional views that show the mounting bracket 25.12 pressing against the exterior wall of the mounting block 8.2-2. In FIGS. 13E-13K, the flange 25.6 secures a structure (such as the mounting bracket 25.12) to the interior of the mounting block (7, 8).

As detailed in FIG. 13L, the flange (25.6) has a threaded hole 25.6-3 that defines a bolt axis 25.6-4 and a rotational plane 25.6-5 that is perpendicular to the bolt axis 25.6-4. The first (obstruction) portion 25.6-1 is shaped to pass through the elongate mounting hole 8.2 in a first rotational orientation within the rotational plane (see FIGS. 13A and 13N). But when in a second rotational orientation, the first (obstruction) portion 25.6-1 is prevented from passing through the elongate mounting hole 8.2 (see FIGS. 13C and 13O). The second (seating) portion 25.6-2 is shaped to seat into the elongate mounting hole 8.2 when the flange 25.6 is in the second rotational orientation, and thereby preventing rotation of the flange 25.6. A bolt 25.5 is disposed in the threaded hole 25.6-3. The first rotational orientation is shown to be offset 90 degrees from the second rotational orientation (see FIGS. 13N and 13O). Other offsets may be possible without deviating from the invention. A schematic with preferred dimensions of the flange is presented in FIG. 13M.

FIGS. 13P-13X illustrate a flange made according to a second design. Like the previously discussed flange, the flange in FIGS. 13P-13X has a first rotational orientation that allows the flange to enter the container mounting block hole and a second rotational orientation where the first (obstruction) portion of the flange prevents the flange from passing through the container mounting block hole. The second portion of the flange 25.6-2 seats into the mounting hole while in the second orientation, thereby preventing rotation of the flange. As demonstrated by the two flange designs detailed herein, the first portion of the flange and the second portion of the flange can take various shapes, but those shapes must allow for the insertion of the flange in a first rotational orientation and allow for the seating of the flange in the second rotational orientation.

FIG. 13A illustrates an insertion configuration wherein the flange 25.6 is in the first rotational orientation and first (obstruction) portion 25.6-1 and the second (seating) portion 25.6-2 pass through the elongate mounting hole 8.2. FIG. 13B is the transition from the insertion configuration to a seating configuration shown in FIG. 13C, wherein the bolt 25.5 is rotated 25.10 to place the flange 25.6 in the second rotational orientation 25.9, seating the second (seating) portion 25.6-2 into the elongate mounting hole 8.2 and preventing the rotation of the flange 25.6. FIG. 13D illustrates a secure configuration, wherein the bolt 25.5 is rotated 25.9, causing the flange 25.6 to (1) move along the bolt axis 25.11 and (2) press against an interior wall of the mounting block 8.2-1.

Figure 17A:
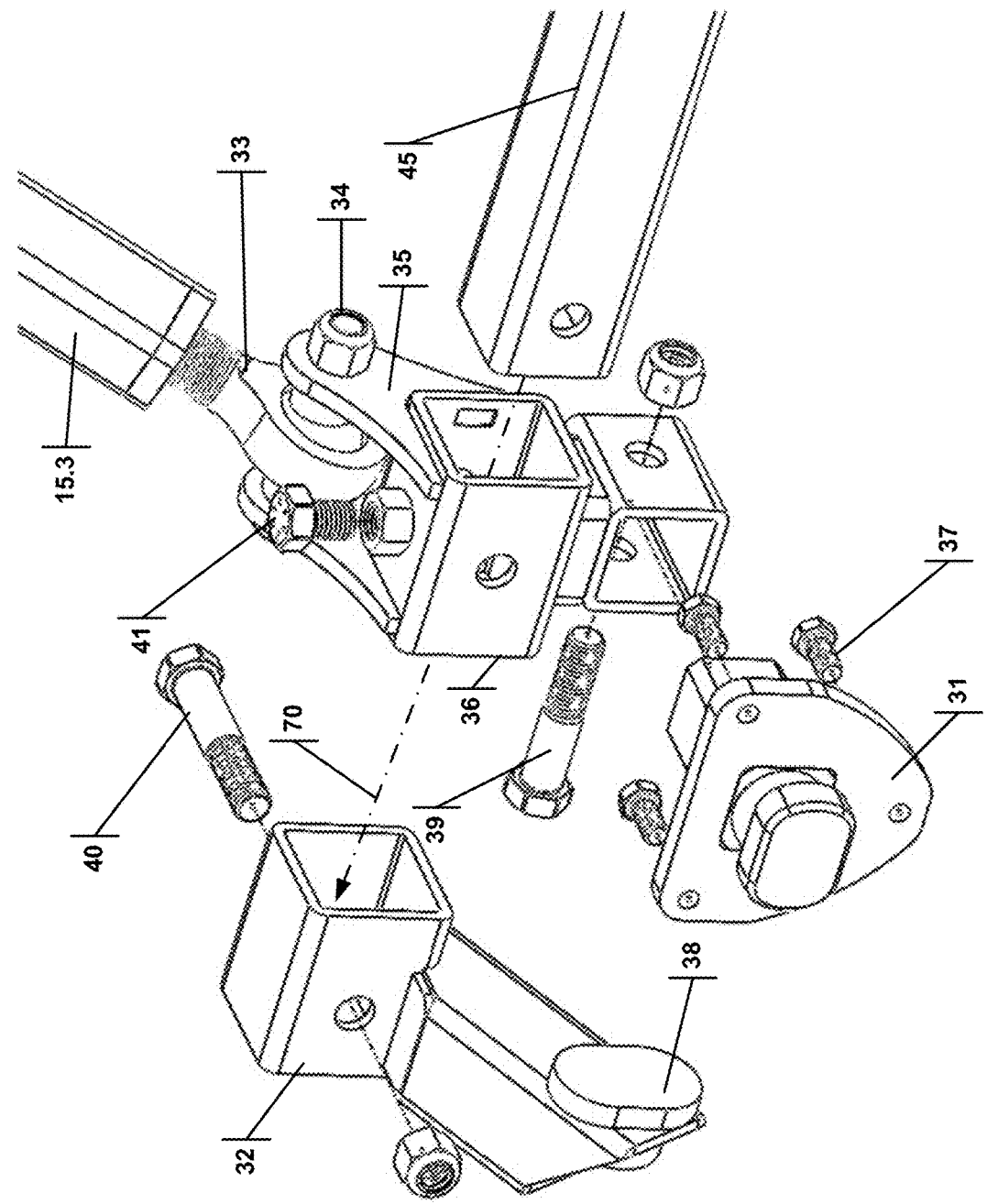
FIG. 17A is an exploded isometric view of the bottom block connection assembly.
Figure 17B:
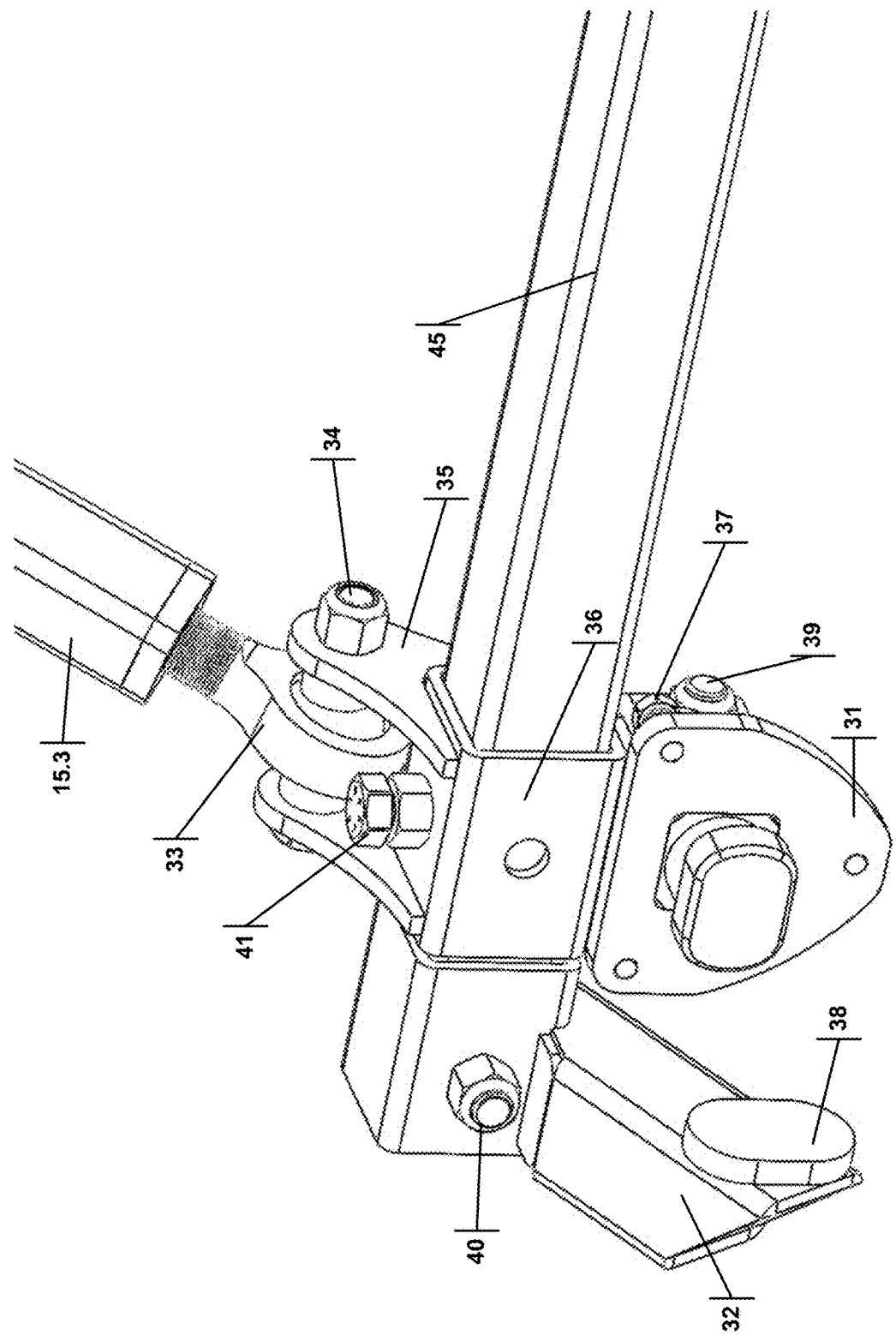
FIG. 17B is an isometric view of the bottom block connection assembly.
Figure 18:
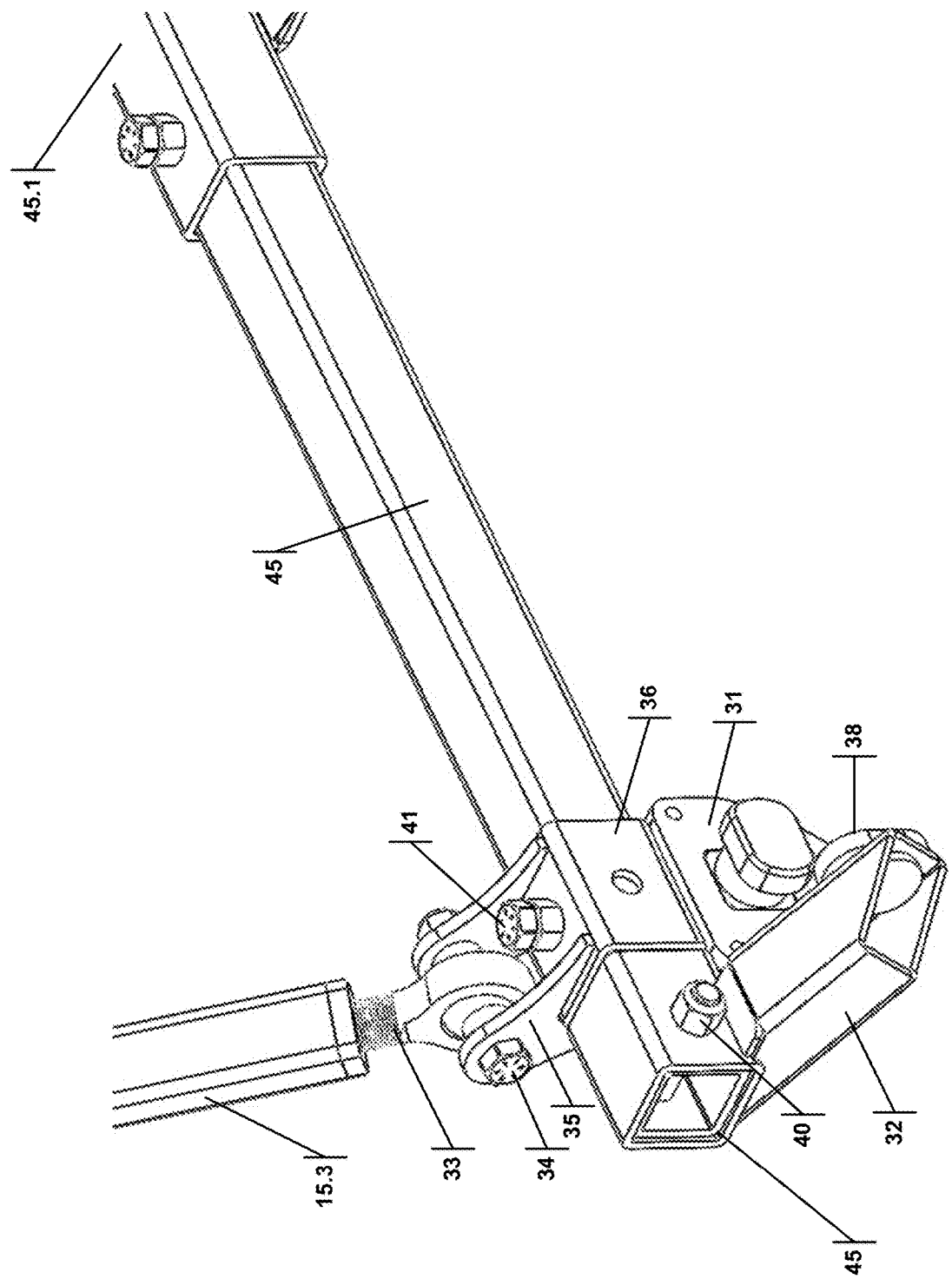
FIG. 18 is an isometric view of the bottom block connection assembly.
Figure 19:
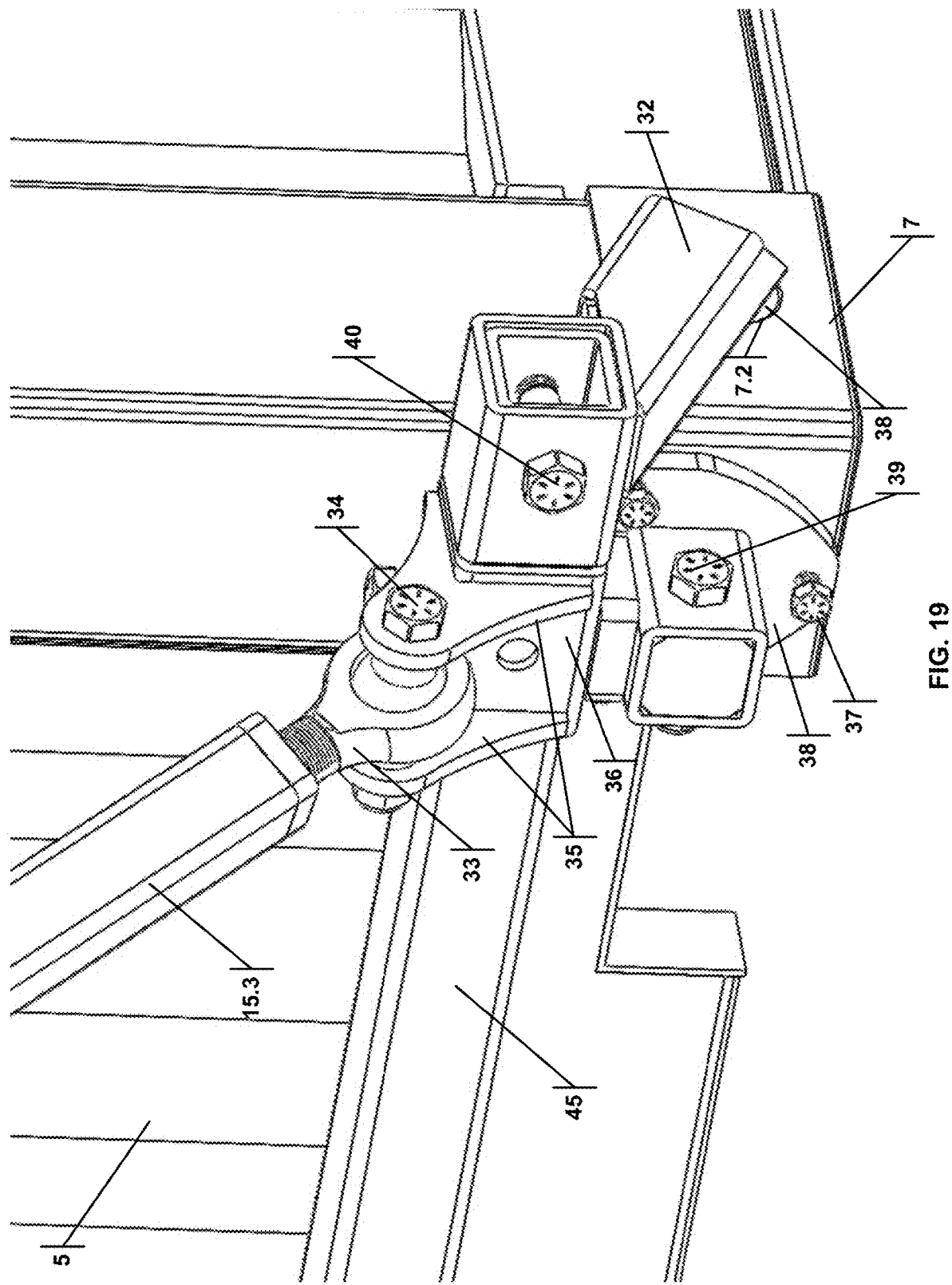
FIG. 19 is a side isometric view of the bottom block connection assembly connected to the bottom container mounting block of a container.
Figure 20:
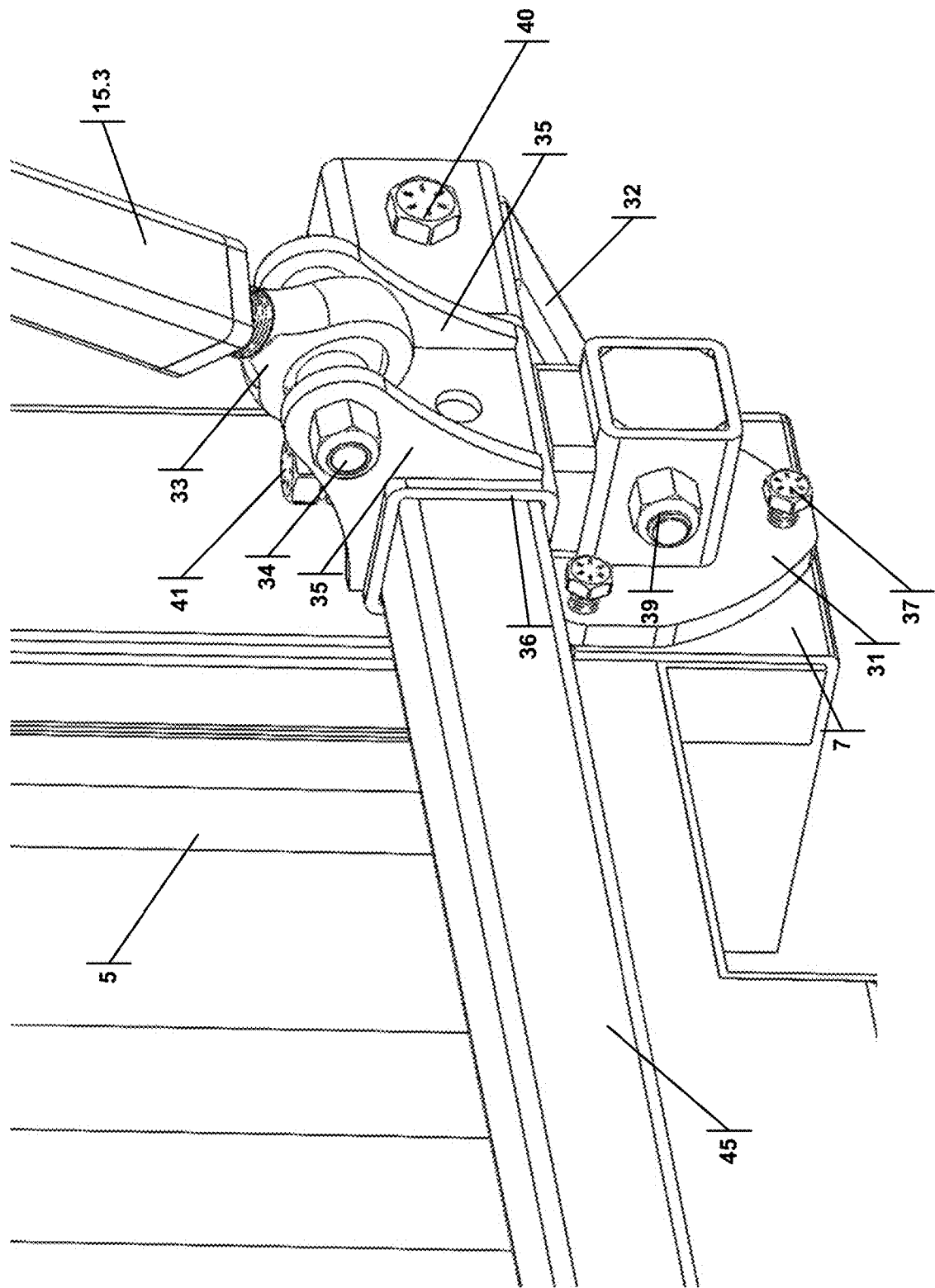
FIG. 20 is a side isometric view of the bottom block connection assembly connected to the bottom container mounting block of a container.
Figure 24A:
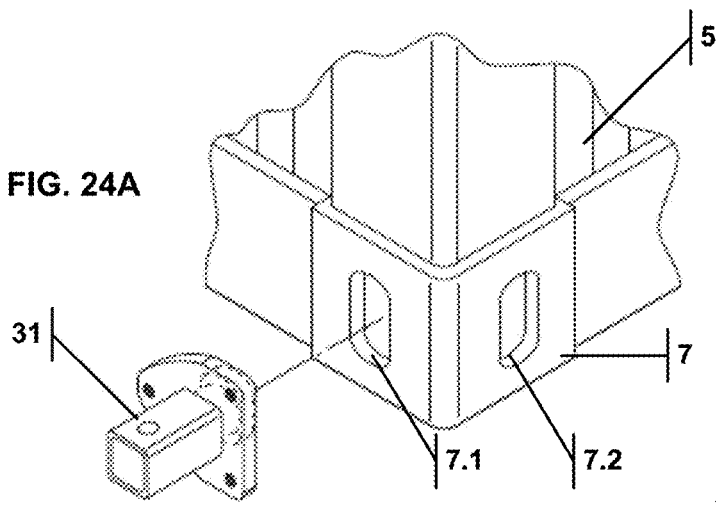
FIG. 24A illustrates the initial alignment of the cam lug relative to the bottom container mounting block of a container.
Figure 24B:
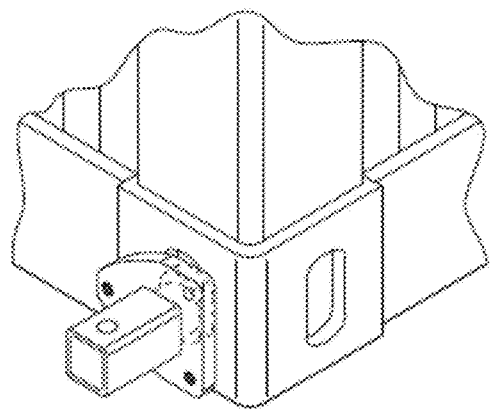
FIG. 24B illustrates the insertion of the cam lug into the bottom container mounting block of a container.
Figure 24C:
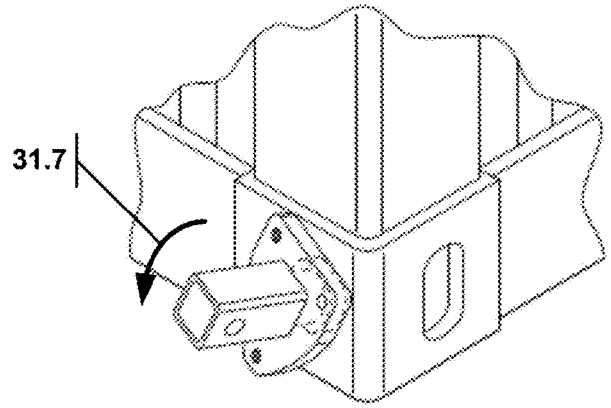
FIG. 24C illustrates the rotation of the cam lug while it is inserted into the bottom container mounting block of a container.
Figure 24D:
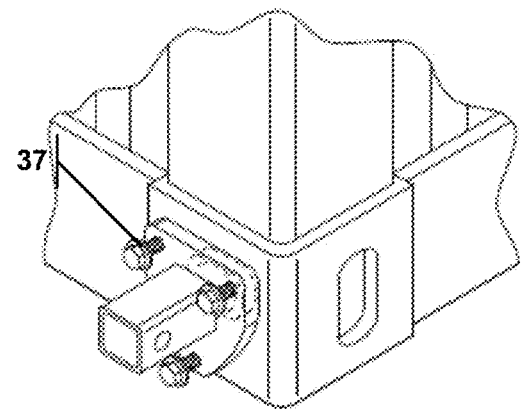

FIGS. 17A through 18 detail the bottom block connection assembly 30. Located at the end of each strut 15.1, the bottom block connection assembly 30 includes a Heim joint 33, rotationally connected via support bolt 34 to the Heim supports 35 extending from the cross-bar connector 36. The cross bar 45 extends through the cross-bar connector 36 and is secured thereto by the bolt 41. The cross bar 45 also extends through the orthogonal connection bar 32 and is affixed to the cross bar 45 by bolt 40. A lug 38 extends from the orthogonal connection bar 32 and is constructed to be inserted into the bottom mounting block hole 7.2. The cross-bar connector 36 also connects to a cam lug 31 and is affixed thereto by bolt 39. Set bolts 37 secure the cam lug 31 to the bottom container mounting block 7. The cam lug 31 attaches to a first face of the bottom container mounting block 7, while the lug 38 of the orthogonal connection bar 32 attaches to a second face of the container mounting block 7 that is orthogonal to the first face. FIG. 24A illustrates the bottom mounting block hole 7.1 into which the cam lug 31 connects, as well as the bottom mounting block hole 7.2 into which the lug 38 of the orthogonal connection bar 32 attaches.

FIGS. 22A and 22B detail the cross bar 45 and the cross-bar eyelet bracket 45.1. Bolts 46 may be removed to allow the cross bar 45 (which may have two sections, 45A and 45B, as shown) to slide into the cross-bar eyelet bracket 45.1, which is shown by the arrows 48, which indicate the directions of the sliding movement of the cross-bar sections 45A, 45B into the cross-bar eyelet bracket 45.1. This freedom of movement allows for an easy installation of the bottom block connection assembly 30 to the container 5.

Figure 23A:
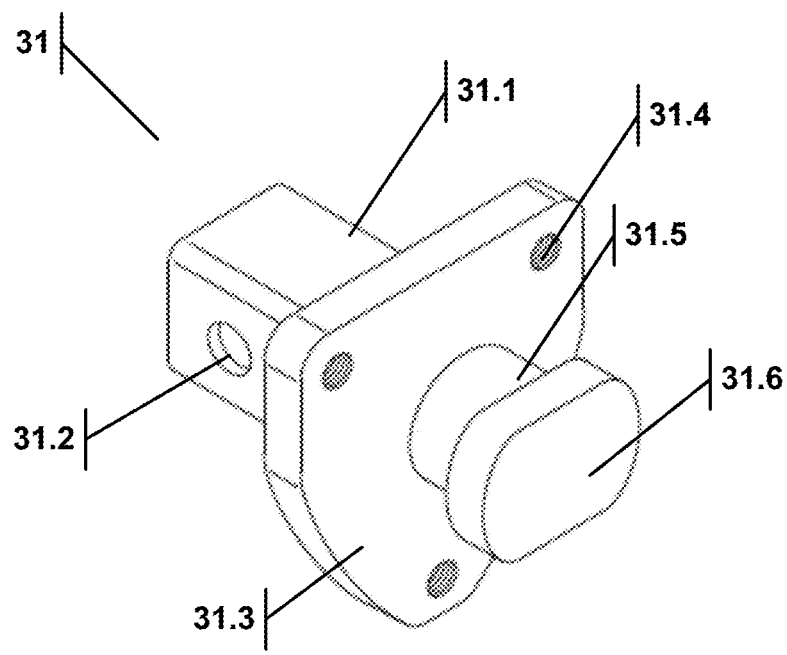
FIG. 23A is a front isometric view of the cam lug.
Figure 23B:
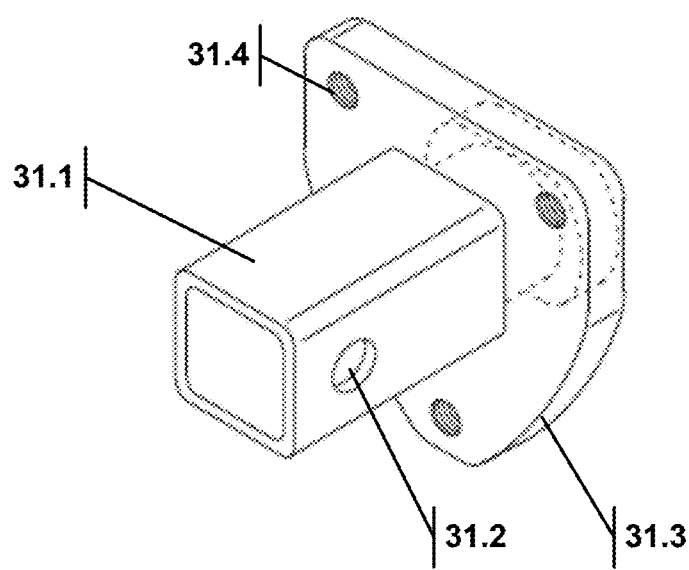
FIG. 23B is a rear isometric view of the cam lug.

FIGS. 23A and 23B show the cam lug 31 in greater detail. The cam lug 31 comprises a cam flange 31.3 with set bolt threading 31.4, connected to a necked lug 31.5 with an oblong tip 31.6. The cam flange 31.3 is triangularly shaped with rounded corners. A connection post 31.1 with a post hole 31.2 allows the cam lug 31 to be fixably mounted to the container mounting blocks, as shown in FIGS. 24A-24D. The mounting hole 7.1 is oblong. First, the necked lug 31.5 of the cam lug 31 is inserted into the mounting hole 7.1 (FIGS. 24A-24B); then, the cam lug 31 is turned 90-degrees (arrow 31.7, FIG. 24C), which locks the mounting hole 7.1 to the cam lug 31. However, in the absence of the cam flange 31.3, the necked lug 31.5 will slide vertically within the mounting hole 7.1. The cam flange 31.3 is shaped to allow the insertion of the necked lug 31.5 into the mounting hole 7.1. When the cam lug 31 is rotated, the cam flange 31.3 pushes against the ground, lifting the necked lug 31.5 up against the inner top surface of the bottom container mounting block 7. Thus, there is substantially no vertical play. Also, when the necked lug 31.5 is rotated 90 degrees after insertion, the long side of the oblong tip 31.6 is up against the inner top surface of the bottom container mounting block 7. Having a greater surface area of contact with little to no vertical play yields a much stronger and stabler connection. Finally, once the cam lug 31 is in the proper position, the set bolts 37 can be threaded through the set bolt threading 31.4, mounting the cam lug 31 to the bottom container mounting block 7.

FIGS. 25A and 25B detail the container saddle 50, upon which the container 5 may be mounted. As shown in FIGS. 25C and 25D, the saddle 50 may support a leaf spring 60 and an axle 65, upon which wheels 50 may be mounted.

Installation of the V-Lift Frame 15 will now be described. The following installation steps are not presented in any order and are not intended to be limited as such.

The two bottom block assemblies 30 and the cross bar 45 are attached to the container 5 as follows: (A) into each bottom corner of the container 5, the cam lugs 31 are installed into the bottom container mounting block 7, as shown in FIGS. 24A-24D and described above; (B) the cross-bar connectors 36 slide over the connection posts 31.1 of the cam lugs 31 and are secured by bolts 39 inserted through the post holes 31.2; (C) each cross-bar connector 36 receives one section 45A of the cross bar 45 (see arrow 70, FIG. 17A); (D) the cross-bar eyelet bracket 45.1 receives both cross-bar sections 45A, 45B (see arrows 48, FIG. 22B); (E) the lug 38 for each orthogonal connection bar 32 receives one section 45A of the cross bar 45 (see arrow 70, FIG. 17A) and is inserted into the bottom container mounting block 7 (in the mounting hole with a face that is orthogonal to the face of the mounting hole that supports the cam lug 31); and (F) bolts 40 and 46 are tightened to secure the bottom block assemblies 30 and to secure the cross bar 45 to the container 5.

The gooseneck 20 is mounted to the pickup bed ball joint, and the upper plugs 25.1 are aligned and inserted into the top container mounting block 8. Alignment is facilitated by the rotational freedom of the upper plug 25.1 relative to the V-Lift Frame 15 (see FIG. 11). Once inserted, the plug mounting bolt 25.5 is inserted through the top mounting block 8.1 with the flange 25.6 in the proper rotational position to allow insertion (FIG. 13A), and the plug mounting bolt 25.5 is secured to the upper plug 25.1. While securing, the first (obstruction) portion of the flange 25.6-1 is rotated within the top container mounting block 8 such that the plug mounting bolt 25.5 cannot exit, and the second (seating) portion of the flange 25.6-2 seats within the hole 8.2, preventing the rotation of the flange 25.6 (see FIGS. 13, 13B, 13C and 13D).

The winch cable 15.9 is connected to the cross-bar eyelet bracket 45.1, and the winch 15.6 is actuated to lift the bottom of the container 5. Once it is lifted sufficiently, the Heim joints 33 are aligned between the Heim supports 35, and the Heim support bolts 34 are inserted and secured. At this point, the container 5 may be transported.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently-preferred embodiment of the invention and are therefore representative of the subject matter that is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A connection structure (25.6) for use with a container (5) with a mounting block (7, 8), wherein the mounting block (7, 8) comprises an elongate mounting hole (8.2), the connection structure (25.6) comprising:
　a flange (25.6) comprising:
　　a threaded hole (25.6-3) that defines a bolt axis (25.6-4);
　　a rotational plane (25.6-5) perpendicular to the bolt axis (25.6-4);
　　a first (obstruction) portion (25.6-1) shaped to:
　　　pass through the elongate mounting hole (8.2) in a first rotational orientation within the rotational plane (25.6-5); and
　　　be prevented from passing through the elongate mounting hole (8.2) in a second rotational orientation within the rotational plane (25.6-5);
　　wherein the first rotational orientation is offset from the second rotational orientation by 90 degrees;
　　a second (seating) portion (25.6-2) shaped to seat into the elongate mounting hole (8.2) when the flange (25.6) is in the second rotational orientation, and thereby preventing rotation of the flange (25.6); and
　a bolt (25.5) disposed in the threaded hole (25.6-3).

2. The connection structure (25.6) of claim 1, wherein the flange (25.6) comprises:
　an insertion configuration, wherein the flange (25.6) is in the first rotational orientation, and the first (obstruction) portion (25.6-1) and the second (seating) portion (25.6-2) pass through the elongate mounting hole (8.2);
　a seating configuration, wherein the bolt (25.5) is rotated (25.10) to place the flange (25.6) in the second rotational orientation (25.9), seating the second (seating) portion (25.6-2) into the elongate mounting hole (8.2) and preventing the rotation of the flange (25.6); and
　a secure configuration, wherein the bolt (25.5) is rotated (25.9), causing the flange (25.6) to (1) move along the bolt axis (25.11) and (2) press against an interior wall of the mounting block (8.2-1).

3. The connection structure (25.6) of claim 2, further comprising a mounting bracket (25.12) constructed to press against an exterior wall of the mounting block (8.2-2) when in the secure configuration.

4. The connection structure (25.6) of claim 3, wherein the mounting bracket (25.12) further comprises a mounting structure (25.13).

5. The connection structure (25.6) of claim 2, wherein the bolt (25.5) pushes against a second interior wall of the mounting block when in the secure configuration.

6. The connection structure (25.6) of claim 1, wherein the connection structure (25.6) secures a structure to the interior of the mounting block (7, 8).

7. The connection structure (25.6) of claim 1, wherein the connection structure (25.6) secures a structure to the exterior of the mounting block (7, 8).

8. A connection structure (25.6) for use with a container (5) with a mounting block (7, 8), wherein the mounting block (7, 8) comprises an elongate mounting hole (8.2), the connection structure (25.6) comprising:
　a flange (25.6) comprising:
　　a threaded hole (25.6-3) that defines a bolt axis (25.6-4);
　　a rotational plane (25.6-5) perpendicular to the bolt axis (25.6-4);
　　a first (obstruction) portion (25.6-1) shaped to:
　　　pass through the elongate mounting hole (8.2) in a first rotational orientation within the rotational plane (25.6-5); and
　　　be prevented from passing through the elongate mounting hole (8.2) in a second rotational orientation within the rotational plane (25.6-5);
　　a second (seating) portion (25.6-2) shaped to seat into the elongate mounting hole (8.2) when the flange (25.6) is in the second rotational orientation, and thereby preventing rotation of the flange (25.6); and
　a bolt (25.5) disposed in the threaded hole (25.6-3);
　wherein the flange (25.6) comprises:
　　an insertion configuration, wherein the flange (25.6) is in the first rotational orientation, and the first (obstruction) portion (25.6-1) and the second (seating) portion (25.6-2) pass through the elongate mounting hole (8.2);
　　a seating configuration, wherein the bolt (25.5) is rotated (25.10) to place the flange (25.6) in the second rotational orientation (25.9), seating the second (seating) portion (25.6-2) into the elongate mounting hole (8.2) and preventing the rotation of the flange (25.6); and
　　a secure configuration, wherein the bolt (25.5) is rotated (25.9), causing the flange (25.6) to (1) move along the bolt axis (25.11) and (2) press against an interior wall of the mounting block (8.2-1).

9. The connection structure (25.6) of claim 8, further comprising a mounting bracket (25.12) constructed to press against an exterior wall of the mounting block (8.2-2) when in the secure configuration.

10. The connection structure (25.6) of claim 9, wherein the mounting bracket (25.12) further comprises a mounting structure (25.13).

11. The connection structure (25.6) of claim 8, wherein the bolt (25.5) pushes against a second interior wall of the mounting block when in the secure configuration.

12. The connection structure (25.6) of claim 8, wherein the first rotational orientation is offset from the second rotational orientation by 90 degrees.

13. The connection structure (25.6) of claim 8, wherein the connection structure (25.6) secures a structure to the interior of the mounting block (7, 8).

14. The connection structure (25.6) of claim 8, wherein the connection structure (25.6) secures a structure to the exterior of the mounting block (7, 8).

* * * * *